(12) United States Patent
Nishimura et al.

(10) Patent No.: US 9,429,694 B2
(45) Date of Patent: Aug. 30, 2016

(54) WAVELENGTH TUNABLE INTERFERENCE FILTER, OPTICAL FILTER DEVICE, OPTICAL MODULE, AND ELECTRONIC APPARATUS

(71) Applicant: Seiko Epson Corporation, Tokyo (JP)

(72) Inventors: Teruyuki Nishimura, Matsumoto (JP); Hiroshi Komatsu, Shimosuwa (JP)

(73) Assignee: Seiko Epson Corporation (JP)

( * ) Notice: Subject to any disclaimer, the term of this patent is extended or adjusted under 35 U.S.C. 154(b) by 141 days.

(21) Appl. No.: 14/044,270

(22) Filed: Oct. 2, 2013

(65) Prior Publication Data

US 2014/0092479 A1 Apr. 3, 2014

(30) Foreign Application Priority Data

Oct. 3, 2012 (JP) ................................. 2012-221028

(51) Int. Cl.
*G02B 5/28* (2006.01)
*G02B 26/00* (2006.01)

(52) U.S. Cl.
CPC ............... *G02B 5/28* (2013.01); *G02B 26/001* (2013.01)

(58) Field of Classification Search
CPC G02B 26/001; G02B 26/0858; G02B 26/08; G02B 26/0833; G02B 26/0841; G02B 26/085; G02B 5/0816; G02B 5/20; G02B 5/28; G02B 6/29361; G01J 3/26; G01J 2003/1213; G01J 2003/1226
USPC ....... 359/577, 578, 579, 580, 581, 584, 589, 359/221.2, 223.1, 224.1; 250/206, 206.1, 250/226
See application file for complete search history.

(56) References Cited

U.S. PATENT DOCUMENTS

| | | | |
|---|---|---|---|
| 8,164,757 B2 | 4/2012 | Yamanoi et al. | |
| 2003/0116711 A1* | 6/2003 | Hara et al. | 250/338.1 |
| 2004/0161193 A1* | 8/2004 | Yee | G02B 6/29389 385/31 |
| 2010/0091372 A1 | 4/2010 | Yamanoi et al. | |
| 2012/0120402 A1* | 5/2012 | Hirokubo et al. | 356/450 |
| 2012/0287438 A1* | 11/2012 | Nishimura et al. | 356/450 |
| 2013/0083400 A1* | 4/2013 | Nishimura et al. | 359/578 |
| 2013/0306838 A1 | 11/2013 | Matsushita | |

FOREIGN PATENT DOCUMENTS

| | | |
|---|---|---|
| JP | 2003-185941 A | 7/2003 |
| JP | 2008-256837 A | 10/2008 |
| JP | 2011-053510 A | 3/2011 |
| JP | 2013-242359 A | 12/2013 |

* cited by examiner

*Primary Examiner* — Bumsuk Won
*Assistant Examiner* — Ephrem Mebrahtu
(74) *Attorney, Agent, or Firm* — Harness, Dickey & Pierce, P.L.C.

(57) ABSTRACT

A wavelength tunable interference filter, an optical filter device, an optical module, and an electronic apparatus include a fixed substrate, a movable substrate, a fixed reflective film provided on the fixed substrate, a movable reflective film provided on the movable substrate and facing the fixed reflective film with an inter-reflective film gap interposed therebetween, and an electrostatic actuator that changes the size of the inter-reflective film gap. The movable substrate is curved in a convex shape in a direction away from the fixed substrate in an initial state. The reflective film has reflectance characteristics in which the first reflectance at a predetermined first wavelength in a measurement wavelength range is lower than the second reflectance at a second wavelength longer than the first wavelength.

16 Claims, 13 Drawing Sheets

WAVELENGTH TUNABLE INTERFERENCE FILTER, OPTICAL FILTER DEVICE, OPTICAL MODULE, AND ELECTRONIC APPARATUS

BACKGROUND

1. Technical Field

The present invention relates to a wavelength tunable interference filter, an optical filter device, an optical module, and an electronic apparatus.

2. Related Art

A wavelength tunable interference filter that extracts light with a predetermined wavelength from incident light is known (for example, refer to JP-A-2003-185941).

The Fabry-Perot filter (wavelength tunable interference filter) disclosed in JP-A-2003-185941 includes a fixed substrate and a movable substrate disposed opposite the fixed substrate with a spacer interposed therebetween, and a fixed mirror is provided on the fixed substrate and a movable mirror is provided on the movable substrate. In addition, the movable substrate includes a diaphragm and a protruding portion surrounded by the diaphragm, and the movable mirror is disposed in the protruding portion. In addition, in the wavelength tunable interference filter, a configuration is adopted in which the size of a gap between the fixed mirror and a reflector is changed by bending a diaphragm of the movable substrate to the fixed substrate side using electrostatic attraction generated by applying a voltage between the diaphragm and the fixed substrate.

Incidentally, in the Fabry-Perot filter disclosed in JP-A-2003-185941, a configuration is adopted in which the bending of the protruding portion formed in a larger thickness than the diaphragm is suppressed by bending the diaphragm to the fixed substrate side when changing the size of the gap between the fixed mirror and the movable mirror. In practice, however, if the diaphragm is bent, the protruding portion is also slightly bent, and the movable mirror provided in the protruding portion is also bent. Therefore, in the wavelength tunable interference filter disclosed in JP-A-2003-185941, when the size of the gap between the fixed mirror and the movable mirror is reduced from the initial state where the gap between the fixed mirror and the movable mirror is largest, that is, when light extracted by the wavelength tunable interference filter is shifted from the long wavelength side to the short wavelength side, the full width at half maximum is increased by the influence of the bending of the movable mirror. As a result, a resolution is reduced.

On the other hand, the reflectance of the fixed mirror or the movable mirror changes with a material of the fixed mirror or the movable mirror. In general, when a reflective film is formed of a metal material, the reflectance increases from the short wavelength side toward the long wavelength side in a visible region.

Accordingly, when the light extracted by the wavelength tunable interference filter is shifted from the long wavelength side to the short wavelength side as described above, there is a problem in that the resolution becomes more uneven due to the influence of the bending of the movable mirror and the influence of the reflectance characteristics of the fixed mirror or the movable mirror.

SUMMARY

An advantage of some aspects of the invention is to provide a wavelength tunable interference filter capable of extracting light with uniform resolution for each wavelength in a measurement wavelength range, an optical filter device, an optical module, and an electronic apparatus.

An aspect of the invention is directed to a wavelength tunable interference filter including: a first substrate; a second substrate disposed so as to face the first substrate; a first reflective film that is provided on the first substrate and reflects a part of incident light and transmits the rest; a second reflective film that is provided on the second substrate, is disposed so as to face the first reflective film, and reflects a part of incident light and transmits the rest; and a gap change portion that changes a size of a gap between the first and second reflective films by bending the second substrate to a side of the first substrate. In an initial state where the size of the gap is not changed by the gap change portion, the second substrate is curved so as to be convex on an opposite side to a side where the first substrate is disposed, and a first reflectance of each of the first and second reflective films at a first wavelength in a visible wavelength range is lower than a second reflectance of each of the first and second reflective films at a second wavelength longer than the first wavelength in the visible wavelength range.

Here, in the wavelength tunable interference filter described above, "in an initial state where the size of the gap is not changed by the gap change portion, the second substrate is curved so as to be convex on an opposite side to a side where the first substrate is disposed" indicates a state where a movable region of the second substrate, in which at least the second reflective film is provided, is gently curved.

In the wavelength tunable interference filter described above, in the initial state, since the region of the second substrate where at least the second reflective film is provided is gently curved in a direction away from the first substrate, the movable reflective film is also gently bent. In addition, in the wavelength tunable interference filter described above, the gap change portion bends the second substrate to the first substrate side. That is, the gap change portion changes the size of the gap such that the first and second substrates are brought close to each other in parallel from the initial state in which the first and second substrates are curved in a direction away from the first substrate. In such a case, since the bending of the reflective film decreases as the size of the gap between reflective films decreases, that is, the bending of the reflective film decreases from the long wavelength side toward the short wavelength side, the parallelization of the first and second reflective films is improved.

On the other hand, each of the first and second reflective films has reflectance characteristics in which the first reflectance at a first wavelength is lower than the second reflectance at a second wavelength longer than the first wavelength. That is, the reflectance of each of the first and second reflective films decreases from the long wavelength side toward the short wavelength side.

That is, as will be described in detail later, in the invention, when extracting light with a long wavelength using the wavelength tunable interference filter, the reflectance of each of the first and second reflective films is high, but the influence of the bending of the second reflective film due to the second substrate being curved is large. When extracting light with a short wavelength, the reflectance of each of the first and second reflective films is low, but the influence of the bending of the second reflective film due to the second substrate being curved is small. Therefore, since it is possible to make the resolution at each wavelength in the measurement wavelength range almost uniform, it is possible to extract light having each wavelength with almost uniform resolution.

In the wavelength tunable interference filter according to the aspect of the invention, it is preferable that the wavelength tunable interference filter further includes a curve forming portion that is provided on the second substrate and curves the second substrate to the opposite side to the side where the first substrate is disposed.

In the wavelength tunable interference filter described above, the second substrate is curved by providing the curve forming portion on the second substrate. In this case, for example, the second substrate can be easily curved just by providing the curve forming portion on the second substrate without performing processing, such as etching or pressing, on the second substrate.

In the wavelength tunable interference filter according to the aspect of the invention, it is preferable that the curve forming portion is a film-like member and curves the second substrate with internal stress, which is generated in the curve forming portion, in the initial state.

In the wavelength tunable interference filter described above, the curve forming portion is a film-like member and curves the second substrate with internal stress. For this reason, it is easy to form the curve forming portion, and the thickness of the second substrate is not increased since the curve forming portion is a film-like member. That is, it is possible to simplify and miniaturize the configuration of the wavelength tunable interference filter.

In the wavelength tunable interference filter according to the aspect of the invention, it is preferable that the curve forming portion has optical transparency for light in a wavelength range selected by interference of light beams incident between the first and second reflective films and is provided in a light interference region, in which the first and second reflective films overlap each other, in plan view when the first and second substrates are viewed from a substrate thickness direction.

In the wavelength tunable interference filter described above, the curve forming portion having optical transparency is provided in the light interference region where the first and second reflective films overlap each other in plan view. Since the curve forming portion has optical transparency, light incident on the first or second reflective film or light extracted by the first and second reflective films can be transmitted through the curve forming portion. Accordingly, it is possible to suppress a reduction in the amount of light extracted by the wavelength tunable interference filter. In addition, since the curve forming portion is provided in the light interference region, a region of the second substrate where the second reflective film is provided can be appropriately curved in the initial state. Accordingly, it is possible to increase the full width at half maximum on the long wavelength side.

In the wavelength tunable interference filter according to the aspect of the invention, it is preferable that the curve forming portion is provided on a surface of the second substrate not facing the first substrate.

In the wavelength tunable interference filter described above, the curve forming portion is provided on a surface (outer surface) of the second substrate not facing the first reflective film. In this case, the charging of the outer surface of the second substrate can also be prevented by forming the curve forming portion with a material that is not easily charged. In addition, since the curve forming portion can be provided in a wide range of the second substrate, it is possible to reduce the thickness of the curve forming portion itself.

In the wavelength tunable interference filter according to the aspect of the invention, it is preferable that the curve forming portion is disposed so as to cover the second reflective film provided on a surface of the second substrate facing the first substrate.

In the wavelength tunable interference filter described above, the curve forming portion can curve the second substrate, and can function as a protective film of the second reflective film. Accordingly, it is possible to suppress the degradation of the optical characteristics of the second reflective film.

In the wavelength tunable interference filter according to the aspect of the invention, it is preferable that the curve forming portion is provided between the second substrate and the second reflective film.

In the wavelength tunable interference filter described above, the curve forming portion is provided between the second substrate and the second reflective film. In this case, it is possible to improve the adhesion of the second reflective film by the curve forming portion.

In the wavelength tunable interference filter according to the aspect of the invention, it is preferable that the second substrate includes a movable portion, in which the second reflective film is provided, and a holding portion, which is provided outside the movable portion in plan view when the first and second substrates are viewed from a substrate thickness direction and which holds the movable portion so as to be movable back and forth with respect to the first substrate, and that the curve forming portion is provided in the movable portion.

In the wavelength tunable interference filter described above, since the curve forming portion is provided in the movable portion, the holding portion is easily bent compared with a configuration in which the curve forming portion is provided in the holding portion. That is, when a curve forming portion is provided in the holding portion, the thickness of the holding portion is increased. Accordingly, since the holding portion is difficult to bend, it is desirable to apply a strong force using the gap change portion. In contrast, in the present embodiment, as described above, the curve forming portion is not provided on the holding portion. Accordingly, it is possible to change the size of the gap by easily bending the holding portion with a small force.

In addition, since the curve forming portion is provided in the movable portion, it is possible to curve the movable portion effectively, compared with a case where the curve forming portion is provided in the holding portion. Thus, it is possible to bend the second reflective film.

Another aspect of the invention is directed to an optical filter device including a wavelength tunable interference filter and a housing in which the wavelength tunable interference filter is housed. The wavelength tunable interference filter includes: a first substrate; a second substrate disposed so as to face the first substrate; a first reflective film that is provided on the first substrate and reflects a part of incident light and transmits the rest; a second reflective film that is provided on the second substrate, is disposed so as to face the first reflective film, and reflects a part of incident light and transmits the rest; and a gap change portion that changes a size of a gap between the first and second reflective films by bending the second substrate to a side of the first substrate. In an initial state where the size of the gap is not changed by the gap change portion, the second substrate is curved so as to be convex on an opposite side to a side where the first substrate is disposed. A first reflectance of each of the first and second reflective films at a first wavelength in a visible wavelength range is lower than a second reflectance of each of the first and second reflective films at a second wavelength longer than the first wavelength in the visible wavelength range.

In the optical filter device described above, similar to the wavelength tunable interference filter described above, it is possible to make the resolution having each wavelength in the measurement wavelength range uniform and extract light having each wavelength with approximately the same resolution. In addition, since the wavelength tunable interference filter is housed in the housing, it is possible to protect the wavelength tunable interference filter against impact at the time of transportation, for example. In addition, it is possible to suppress the adhesion of foreign matter (for example, water droplets or charged substances) to the first or second reflective film of the wavelength tunable interference filter.

Still another aspect of the invention is directed to an optical module including: a first substrate; a second substrate disposed so as to face the first substrate; a first reflective film that is provided on the first substrate and reflects a part of incident light and transmits the rest; a second reflective film that is provided on the second substrate, is disposed so as to face the first reflective film, and reflects a part of incident light and transmits the rest; a gap change portion that changes a size of a gap between the first and second reflective films by bending the second substrate to a side of the first substrate; and a detection unit that detects light with a wavelength selected by interference of light beams incident between the first and second reflective films. In an initial state where the size of the gap is not changed by the gap change portion, the second substrate is curved so as to be convex on an opposite side to a side where the first substrate is disposed. A first reflectance of each of the first and second reflective films at a first wavelength in a visible wavelength range is lower than a second reflectance of each of the first and second reflective films at a second wavelength longer than the first wavelength in the visible wavelength range.

In the optical module described above, similar to the wavelength tunable interference filter and the optical filter device described above, it is possible to extract light having each wavelength in the measurement wavelength range with uniform resolution. Therefore, since the detection unit can detect light extracted with uniform resolution for each wavelength in the measurement wavelength range, it is possible to measure the amount of light with uniform accuracy regardless of a wavelength.

Yet another aspect of the invention is directed to an electronic apparatus including: a wavelength tunable interference filter and a control unit that controls the wavelength tunable interference filter. The wavelength tunable interference filter includes: a first substrate; a second substrate disposed so as to face the first substrate; a first reflective film that is provided on the first substrate and reflects a part of incident light and transmits the rest; a second reflective film that is provided on the second substrate, is disposed so as to face the first reflective film, and reflects a part of incident light and transmits the rest; and a gap change portion that changes a size of a gap between the first and second reflective films by bending the second substrate to a side of the first substrate. In an initial state where the size of the gap is not changed by the gap change portion, the second substrate is curved so as to be convex on an opposite side to a side where the first substrate is disposed. A first reflectance of each of the first and second reflective films at a first wavelength in a visible wavelength range is lower than a second reflectance of each of the first and second reflective films at a second wavelength longer than the first wavelength in the visible wavelength range.

In the electronic apparatus described above, similar to the wavelength tunable interference filter, the optical filter device, and the optical module described above, it is possible to extract light having each wavelength in the measurement wavelength range with uniform resolution. Therefore, the electronic apparatus can accurately perform various kinds of processing using light with each wavelength extracted with uniform resolution.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described with reference to the accompanying drawings.

Configuration of a Spectrometer

Figure 1:
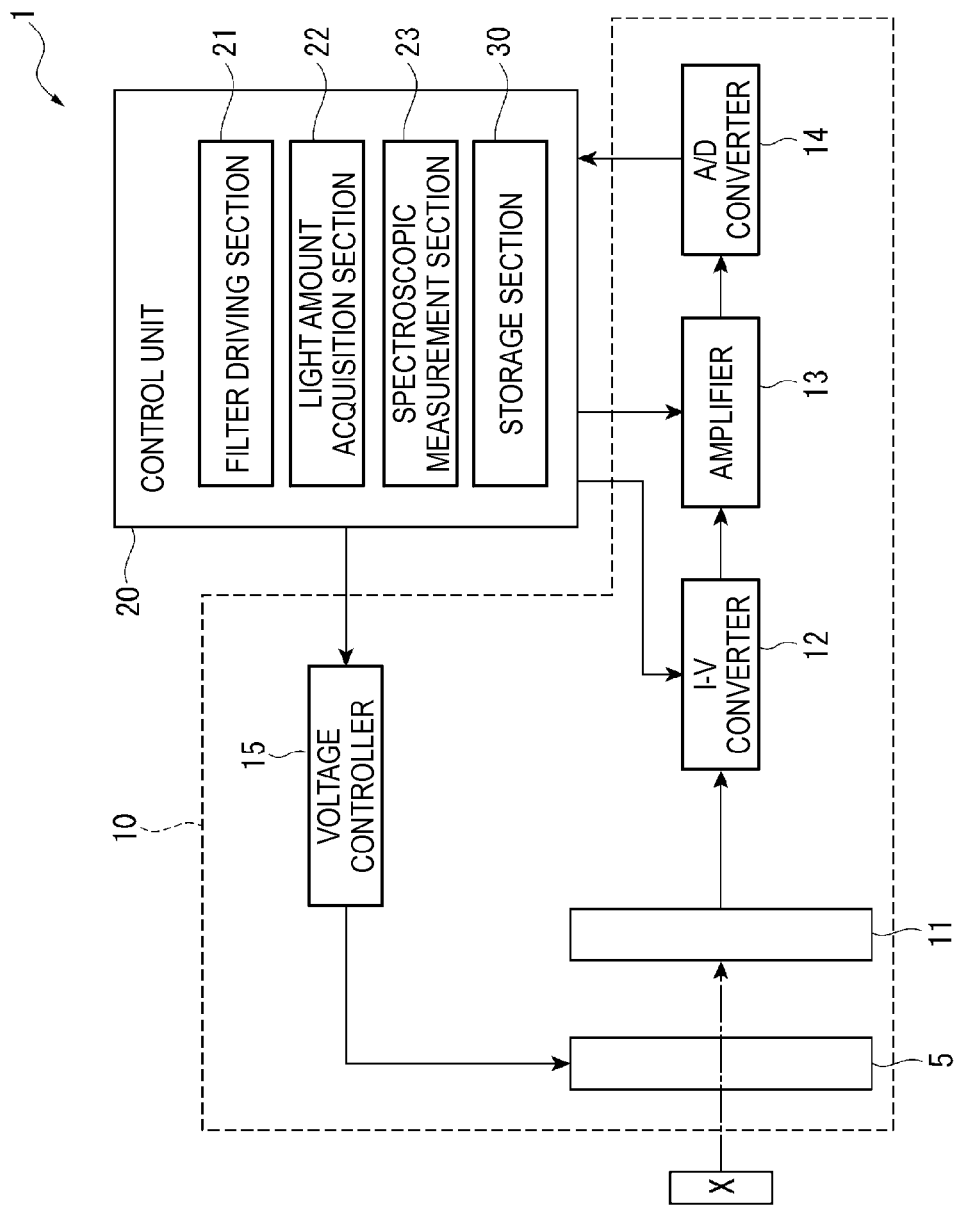
FIG. 1 is a block diagram showing the schematic configuration of a spectrometer of a first embodiment of the invention.

FIG. 1 is a block diagram showing the schematic configuration of a spectrometer according to the first embodiment of the invention.

A spectrometer 1 is an electronic apparatus according to the embodiment of the invention, and is an apparatus that measures a spectrum of measurement target light reflected by a measurement target X on the basis of the measurement target light. In addition, in the present embodiment, the example is shown in which the measurement target light reflected by the measurement target X is measured. However, for example, when a light emitter such as a liquid crystal panel is used as the measurement target X, light emitted from the light emitter may also be used as the measurement target light.

As shown in FIG. 1, the spectrometer 1 includes an optical module 10 and a control unit 20.

Configuration of an Optical Module

Next, the configuration of the optical module 10 will be described below.

As shown in FIG. 1, the optical module 10 is configured to include a wavelength tunable interference filter 5, a detector 11, an I-V converter 12, an amplifier 13, an A/D converter 14, and a voltage controller 15.

The detector 11 receives light transmitted through the wavelength tunable interference filter 5 of the optical module 10 and outputs a detection signal (current) corresponding to the intensity of the received light.

The I-V converter 12 converts the detection signal input from the detector 11 into a voltage value, and outputs it to the amplifier 13.

The amplifier 13 amplifies a voltage (detection voltage) corresponding to the detection signal input from the I-V converter 12.

The A/D converter 14 converts the detection voltage (analog signal) input from the amplifier 13 into a digital signal, and outputs it to the control unit 20.

Configuration of a Wavelength Tunable Interference Filter

Figure 2:
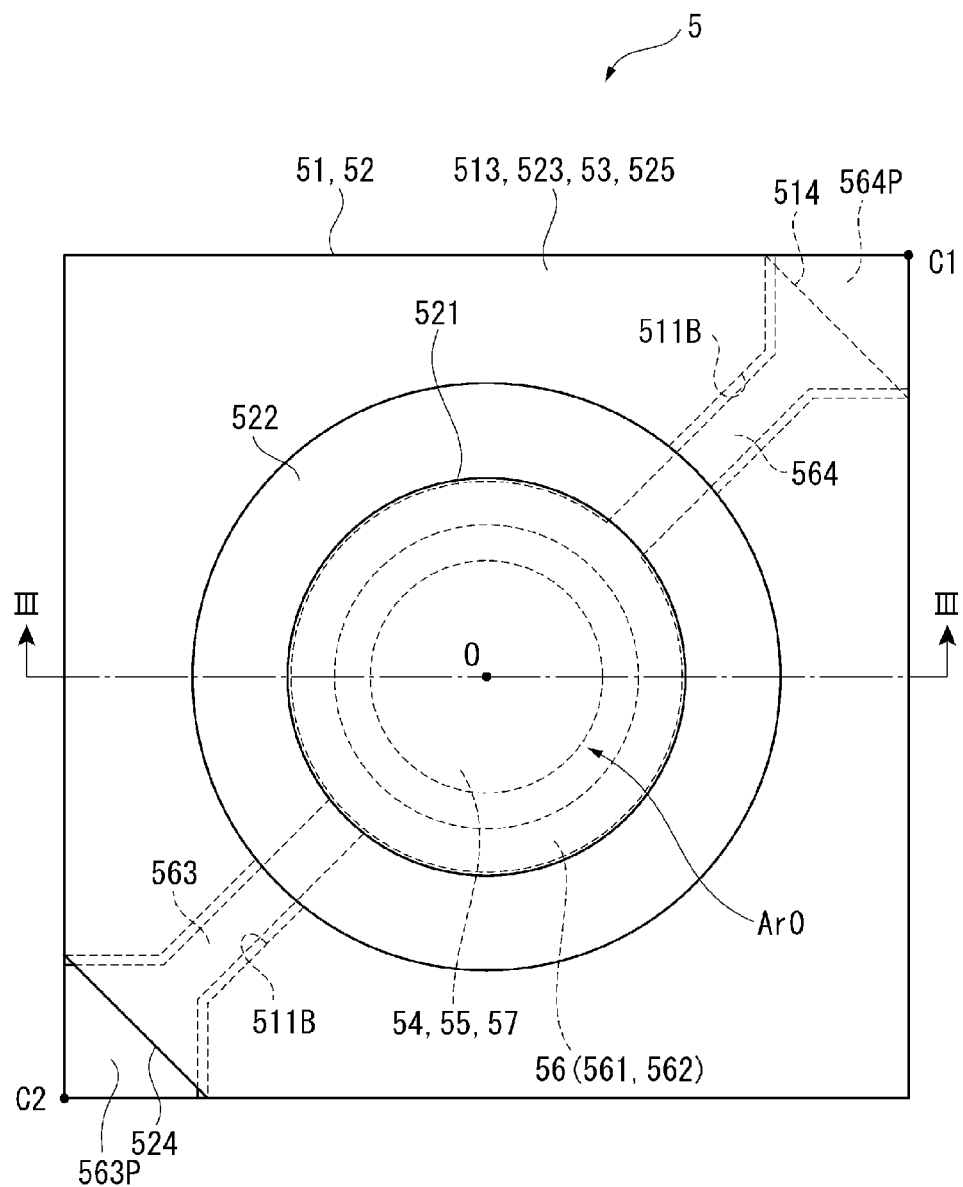
FIG. 2 is a plan view showing the schematic configuration of a wavelength tunable interference filter of the first embodiment.

FIG. 2 is a plan view showing the schematic configuration of the wavelength tunable interference filter 5.

The wavelength tunable interference filter 5 of the present embodiment is a so-called Fabry-Perot etalon. As shown in FIG. 2, the wavelength tunable interference filter 5 includes a fixed substrate 51 and a movable substrate 52. The fixed substrate 51 and the movable substrate 52 are formed of, for example, various kinds of glass, quartz, and silicon. In addition, the fixed substrate 51 and the movable substrate 52 are integrally formed by bonding a first bonding portion 513 of the fixed substrate 51 and a second bonding portion 523 of the movable substrate 52 to each other using a bonding film 53 formed of a plasma-polymerized film containing siloxane as a main component, for example.

A fixed reflective film 54 (first reflective film) is provided on the fixed substrate 51, and a movable reflective film 55 (second reflective film) is provided on the movable substrate 52. The fixed reflective film 54 and the movable reflective film 55 are disposed so as to face each other with an inter-reflective film gap G1 (gap) interposed therebetween. In addition, an electrostatic actuator 56 used as a gap change portion used to adjust (change) the size of the inter-reflective film gap G1 is provided in the wavelength tunable interference filter 5. The electrostatic actuator 56 is formed by a fixed electrode 561 (first electrode) provided on the fixed substrate 51 and a movable electrode 562 (second electrode) provided on the movable substrate 52. The fixed electrode 561 and the movable electrode 562 face each other with an inter-electrode gap interposed therebetween, and function as the electrostatic actuator 56. Here, the fixed electrode 561 and the movable electrode 562 may be directly provided on the surfaces of the fixed substrate 51 and the movable substrate 52, or may be provided with another film member interposed therebetween. In addition, although the example where the size of the inter-electrode gap is larger than the size of the inter-reflective film gap G1 is shown in the present embodiment, for example, the inter-electrode gap may be smaller than the inter-reflective film gap G1.

Configuration of a Fixed Substrate

Figure 3:
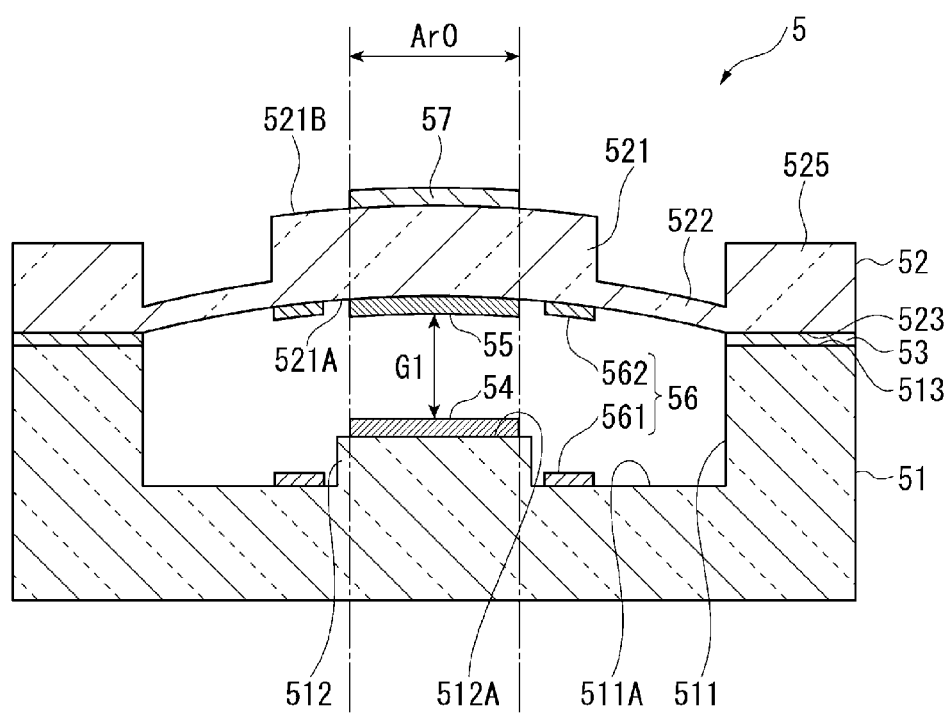
FIG. 3 is a cross-sectional view of the wavelength tunable interference filter of the first embodiment.

FIG. 3 is a cross-sectional view of the wavelength tunable interference filter 5 taken along the line in FIG. 2. FIG. 3 is a diagram showing an initial state where no voltage is applied to the electrostatic actuator 56, that is, a state where the inter-reflective film gap G1 is largest.

Since the fixed substrate 51 is formed in a larger thickness than the movable substrate 52, there is no bending of the fixed substrate 51 due to electrostatic attraction by the electrostatic actuator 56 or the internal stress of a film member (for example, the fixed reflective film 54) formed on the fixed substrate 51.

As shown in FIG. 3, the fixed substrate 51 includes an electrode arrangement groove 511 and a reflective film arrangement portion 512 formed by etching, for example. In addition, as shown in FIG. 2, a cutout portion 514 is provided in a part (apex C1) of the outer peripheral edge of the fixed substrate 51, and a movable electrode pad 564P, which will be described later, is exposed to the surface of the wavelength tunable interference filter 5 through the cutout portion 514.

The electrode arrangement groove 511 is formed in an annular shape, which has a filter center point O of the fixed substrate 51 as its center, in plan view of the filter. As shown in FIG. 3, the reflective film arrangement portion 512 protrudes from the center of the electrode arrangement groove 511 to the movable substrate 52 side.

The groove bottom surface of the electrode arrangement groove 511 becomes an electrode arrangement surface 511A on which the fixed electrode 561 of the electrostatic actuator 56 is disposed. In addition, the protruding distal surface of the reflective film arrangement portion 512 becomes a reflective film arrangement surface 512A on which the fixed reflective film 54 is disposed.

In addition, an electrode extraction groove 511B (refer to FIG. 2) extending from the electrode arrangement groove 511 toward the apices C1 and C2 of the outer peripheral edge of the fixed substrate 51 is provided in the fixed substrate 51.

The fixed electrode 561 is provided on the electrode arrangement surface 511A of the electrode arrangement groove 511. It is preferable that the fixed electrode 561 is formed in an approximately annular shape, which has the filter center point O as its center. More preferably, the fixed electrode 561 is formed in an annular shape. In addition, the annular shape referred to herein includes a C shape having a cutout portion, for example.

In addition, a fixed extraction electrode 563 extending from the outer peripheral edge of the fixed electrode 561 to the apex C2 along the electrode extraction groove 511B toward the apex C2 is provided on the fixed substrate 51. An extending distal portion (portion located at the apex C2 of the fixed substrate 51) of the fixed extraction electrode 563 forms a fixed electrode pad 563P connected to the voltage controller 15.

The fixed electrode 561 may be formed of any material having conductivity. Specifically, the fixed electrode 561 is formed of metal oxide having good adhesion to a metal film or an alloy film. For example, the fixed electrode 561 is formed of an indium tin oxide (ITO) film or a laminate of a Cr layer and an Au layer.

In addition, an insulating film for ensuring the insulation between the fixed electrode 561 and the movable electrode 562 may be laminated on the fixed electrode 561.

In addition, although the configuration in which one fixed electrode 561 is provided on the electrode arrangement surface 511A is shown in the present embodiment, for example, it is possible to adopt a configuration (double electrode configuration) in which two electrodes as concentric circles having the filter center point O as their center are provided.

As described above, the reflective film arrangement portion 512 is formed in an approximately cylindrical shape, which has a smaller diameter than the electrode arrangement groove 511, on the same axis as the electrode arrangement groove 511, and includes the reflective film arrangement surface 512A facing the movable substrate 52 of the reflective film arrangement portion 512.

As shown in FIG. 3, the fixed reflective film 54 is provided in the reflective film arrangement portion 512.

Figure 4:
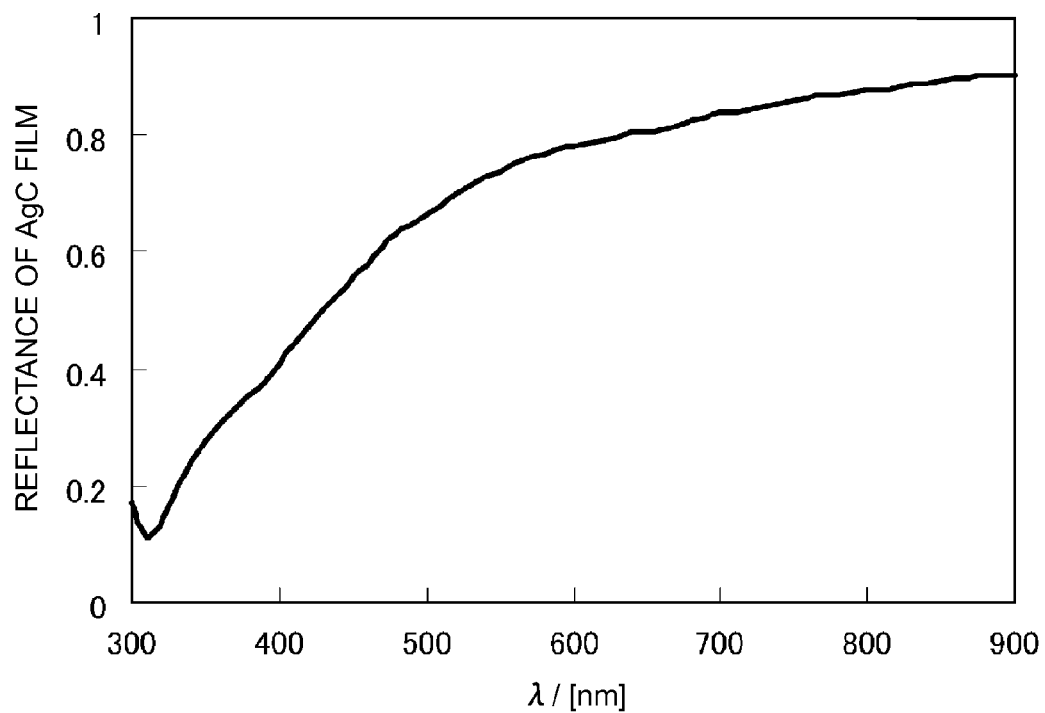
FIG. 4 is a diagram showing the reflectance characteristics of a single-layer AgC voltage film.

FIG. 4 is a diagram showing the reflectance characteristics when a single-layer AgC film is used as the fixed reflective film 54 (movable reflective film 55).

As shown in FIG. 4, the fixed reflective film 54 has reflectance characteristics, in which the reflectance increases from the short wavelength side toward the long wavelength side, in at least a visible wavelength range. That is, the fixed reflective film 54 has reflectance characteristics in which the first reflectance at a first wavelength in the visible wavelength range (for example, 380 nm to 780 nm) is lower than the second reflectance at a second wavelength longer than the first wavelength.

As the fixed reflective film 54 having such reflectance characteristics, it is preferable to use a metal film, such as Ag, and an alloy film, such as an AgC alloy, for example. In the present embodiment, a configuration in which the fixed reflective film 54 is an AgC alloy film is illustrated.

On the light incidence surface (surface on which the fixed reflective film 54 is not provided) of the fixed substrate 51, an antireflection film may be formed at a position corresponding to the fixed reflective film 54. The antireflection film can be formed by laminating a low refractive index film and a high refractive index film alternately, and reduces the reflectance of visible light at the surface of the fixed substrate 51. As a result, the transmittance is increased.

In addition, a portion of the surface of the fixed substrate 51 facing the movable substrate 52, on which the electrode arrangement groove 511, the reflective film arrangement portion 512, and the extraction electrode arrangement groove are not formed, forms the first bonding portion 513.

The first bonding portion 513 is bonded to the second bonding portion 523 of the movable substrate 52 through the bonding film 53.

Configuration of a Movable Substrate

As shown in FIGS. 2 and 3, in plan view of the filter, the movable substrate 52 includes a movable portion 521 having a circular shape with the filter center point O as its center, a holding portion 522 that is coaxial with the movable portion 521 and holds the movable portion 521, and a substrate outer peripheral portion 525 provided outside the holding portion 522.

In addition, as shown in FIG. 3, in the initial state where no voltage is applied to the electrostatic actuator 56, the movable substrate 52 is curved in a convex shape in a direction in which the movable portion 521 and the holding portion 522 move away from the fixed substrate 51.

In addition, as shown in FIG. 2, a cutout portion 524 is provided at the apex C2 on the movable substrate 52. Through the cutout portion 524, a distal end of the fixed electrode pad 563P is exposed as described above.

The movable portion 521 is formed in a larger thickness than the holding portion 522. In the present embodiment, for example, the movable portion 521 is formed in the same thickness as the movable substrate 52 (substrate outer peripheral portion 525). The movable portion 521 is formed so as to have a larger diameter than at least the diameter of the outer peripheral edge of the reflective film arrangement surface 512A in plan view of the filter. In addition, the movable reflective film 55 and the movable electrode 562 are provided on a movable surface 521A of the movable portion 521 facing the fixed substrate 51, and a curve forming film 57 that is a curve forming member according to the invention is provided on an outer surface 521B opposite the movable surface 521A.

As shown in FIGS. 2 and 3, the movable electrode 562 is provided in a region facing the fixed electrode 561 outside the movable reflective film 55 in plan view of the filter.

In addition, a movable extraction electrode 564, which extends in a direction of the apex C1 and is disposed opposite the electrode extraction groove 511B toward the apex C1 of the fixed substrate 51, is provided in the movable electrode 562. An extending distal portion (portion located at the apex C1 of the movable substrate 52) of the movable extraction electrode 564 forms a movable electrode pad 564P connected to the voltage controller 15. Similar to the fixed electrode 561, any material having conductivity may be used as the movable electrode 562. For example, an ITO film or a laminate obtained by laminating an Au layer on a Cr layer can be used.

In the electrode configuration described above, the electrostatic actuator 56 is formed by an annular region where the fixed electrode 561 and the movable electrode 562 overlap each other in plan view of the filter.

In addition, in the present embodiment, as shown in FIG. 3, the gap between the fixed electrode 561 and the movable electrode 562 is formed so as to be larger than the inter-reflective film gap G1. However, the gap between the fixed electrode 561 and the movable electrode 562 is not limited thereto. For example, when infrared light or far-infrared light is set as measurement target light, the inter-reflective film gap G1 may be configured to be larger than the gap between the electrodes 561 and 562 depending on the wavelength range of the measurement target light.

The movable reflective film 55 is formed of the same material as the fixed reflective film 54. Accordingly, similar to the fixed reflective film 54, the movable reflective film 55 has reflectance characteristics in which the reflectance increases from the short wavelength side toward the long wavelength side as shown in FIG. 4.

The holding portion 522 is a diaphragm surrounding the periphery of the movable portion 521, and is formed in a smaller thickness than the movable portion 521. The holding portion 522 bends more easily than the movable portion 521 does. Accordingly, it is possible to displace the movable portion 521 to the fixed substrate 51 side by slight electrostatic attraction.

In addition, although the diaphragm-like holding portion 522 is illustrated in the present embodiment, the invention is not limited thereto. For example, beam-shaped holding portions, which are disposed at equal angular intervals around the filter center point O, may also be provided.

The curve forming film 57 is provided on the outer surface 521B of the movable portion 521 as described above. Specifically, the curve forming film 57 is formed of a material having optical transparency for a measurement wavelength range (for example, 380 nm to 780 nm that is a visible wavelength range) where light is separated by the wavelength tunable interference filter 5. The curve forming film 57 has an internal stress (compressive stress), and curves the movable portion 521 and the holding portion 522 in a convex shape in a direction away from the fixed substrate 51 as described above by the internal stress. The internal stress of the curve forming film 57 changes depending on a film material, a film forming method, and the like. For example, it is possible to form the curve forming film 57 having a compressive stress by forming an $SiO_2$ film using a sputtering method.

In addition, although the curve forming film 57 is formed only in a light interference region Ar0 where the fixed reflective film 54 and the movable reflective film 55 face each other (region where the fixed reflective film 54 and the movable reflective films 55 overlap each other in plan view of the filter) in the example shown in FIG. 3, the region where the curve forming film 57 is formed is not limited thereto. For example, the curve forming film 57 may be formed on the entire outer surface 521B. In this case, since the area where the internal stress is applied by the curve forming film 57 is increased, it is possible to reduce a film thickness required to curve the movable substrate 52 by a predetermined amount. That is, since the film thickness of the curve forming film 57 itself is reduced, it is possible to suppress the optical loss in the curve forming film 57.

As described above, the substrate outer peripheral portion 525 is provided outside the holding portion 522 in plan view of the filter. The second bonding portion 523 facing the first bonding portion 513 is provided on a surface of the substrate outer peripheral portion 525 facing the fixed substrate 51, and is bonded to the first bonding portion 513 through the bonding film 53.

Configuration of a Voltage Controller

The voltage controller 15 is connected to the fixed extraction electrode 563 (fixed electrode pad 563P) and the movable extraction electrode 564 (movable electrode pad 564P) of the wavelength tunable interference filter 5.

In addition, when a voltage command signal corresponding to the measurement target wavelength is received from the control unit 20, the voltage controller 15 applies a corresponding voltage between the fixed extraction electrode 563 and the movable extraction electrode 564. Then, an electrostatic attraction based on the applied voltage is generated in the electrostatic actuator 56 (between the fixed electrode 561 and the movable electrode 562) of the wavelength tunable interference filter 5. As a result, the movable portion 521 is displaced to the fixed substrate 51 side, and the size of the inter-reflective film gap G1 is changed.

Configuration of a Control Unit

The control unit 20 is configured to include a CPU, a memory, and the like, for example, and controls the overall operation of the spectrometer 1. As shown in FIG. 1, the control unit 20 includes a filter driving section 21, a light amount acquisition section 22, and a spectroscopic measurement section 23.

In addition, the control unit 20 includes a storage section 30 that stores various kinds of data, and V-λ data for controlling the electrostatic actuator 56 is stored in the storage section 30.

A peak wavelength of light, which is transmitted through the wavelength tunable interference filter 5, with respect to the voltage applied to the electrostatic actuator 56 is recorded in the V-λ data.

The filter driving section 21 sets a desired wavelength of light extracted by the wavelength tunable interference filter 5, and reads a target voltage value corresponding to the desired wavelength set from the V-λ data stored in the storage section 30. In addition, the filter driving section 21 outputs to the voltage controller 15 a control signal to apply the read target voltage value. As a result, a voltage of the target voltage value is applied from the voltage controller 15 to the electrostatic actuator 56.

The light amount acquisition section 22 acquires the amount of light with a desired wavelength, which has been transmitted through the wavelength tunable interference filter 5, on the basis of the amount of light acquired by the detector 11.

The spectroscopic measurement section 23 measures the spectral characteristics of the measurement target light on the basis of the amount of light acquired by the light amount acquisition section 22.

As examples of the spectroscopy method in the spectroscopic measurement section 23, a method of measuring the spectrum with the amount of light detected for the measurement target wavelength by the detector 11 as the amount of light of the measurement target wavelength and a method of estimating the spectrum on the basis of the amount of light of a plurality of measurement target wavelengths can be mentioned.

As a method of estimating the spectrum, for example, the spectrum of light to be measured is estimated by generating a measurement spectrum matrix, which has each amount of light for a plurality of measurement target wavelengths as a matrix element, and applying a predetermined transformation matrix to the measurement spectrum matrix. In this case, a plurality of sample light beams whose spectrum is known are measured by the spectrometer 1, and a transformation matrix is set such that a deviation between a matrix, which is obtained by applying the transformation matrix to a measurement spectrum matrix generated on the basis of the amount of light obtained by measurement, and the known spectrum becomes minimum.

Optical Characteristics of a Wavelength Tunable Interference Filter

Next, the optical characteristics of the wavelength tunable interference filter 5 described above will be described with reference to the accompanying drawings.

Generally, the optical characteristics in the Fabry-Perot etalon, such as the wavelength tunable interference filter 5, change according to the bending of the reflective film and the reflectance characteristics of the reflective film.

Figure 5:
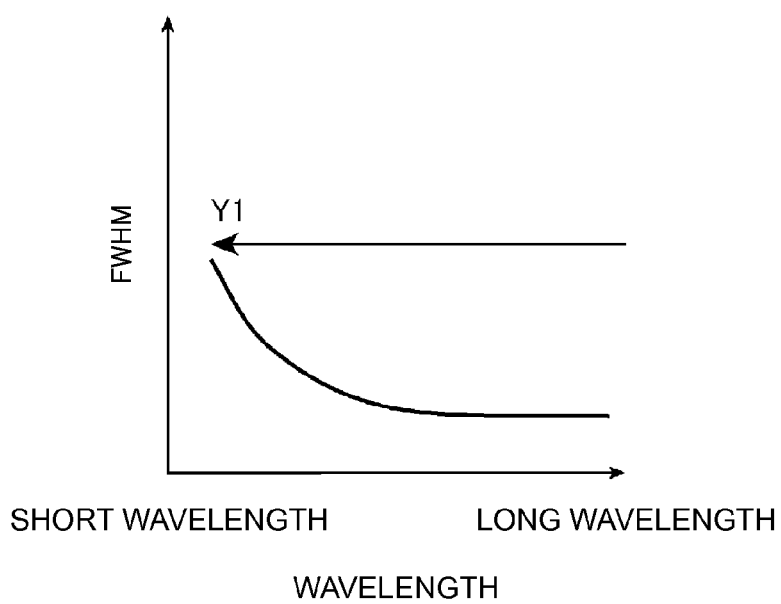
FIG. 5 is a diagram showing the optical characteristics (full width at half maximum) of a wavelength tunable interference filter, in which a reflective film having the reflectance characteristics shown in FIG. 4 is used, when it is assumed that there is no bending of the reflective film in the first embodiment.
Figure 6:
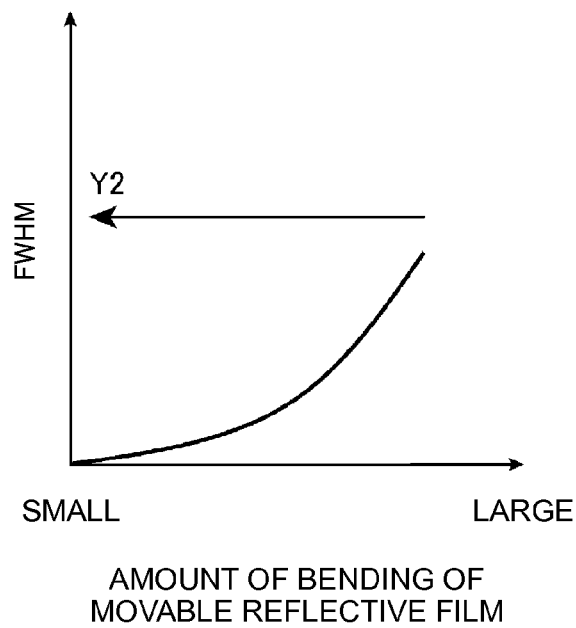
FIG. 6 is a diagram showing the optical characteristics (full width at half maximum) of a wavelength tunable interference filter when the reflectance characteristics of a reflective film, in which the reflectance at each wavelength in the measurement wavelength range is the same, is assumed in the first embodiment.

FIG. 5 shows the optical characteristics (full width at half maximum (FWHM)) of the wavelength tunable interference filter 5, in which a reflective film having the reflectance characteristics shown in FIG. 4 is used as the fixed reflective film 54 and the movable reflective film 55, when it is assumed that there is no bending of the reflective film. In addition, FIG. 6 is a diagram showing the optical characteristics of the wavelength tunable interference filter 5 when the reflectance characteristics of the reflective film, in which the reflectance at each wavelength in the measurement wavelength range is the same, are assumed.

In the wavelength tunable interference filter 5, assuming that there is no bending of the reflective films 54 and 55, the full width at half maximum decreases and the resolution increases as the reflectance of the reflective films 54 and 55 increases. Therefore, as in the present embodiment, when the fixed reflective film 54 and the movable reflective film 55 having the reflectance characteristics shown in FIG. 4 are used and it is assumed that there is no bending of each of the reflective films 54 and 55, the full width at half maximum decreases and the resolution decreases from the short wavelength side toward the long wavelength side as shown in FIG. 5.

For this reason, assuming that there is no bending of the reflective film, when the size of the inter-reflective film gap G1 is reduced from the initial state by applying a voltage to the electrostatic actuator 56, the full width at half maximum of transmitted light is changed as indicated by the arrow Y1 in FIG. 5.

In addition, in the wavelength tunable interference filter 5, assuming that the reflectance characteristics of the reflective films 54 and 55 are uniform, the full width at half maximum decreases as the bending of the reflective films 54 and 55 decreases. That is, when the bending of at least one of the reflective films 54 and 55 is large, the size of the inter-reflective film gap G1 changes depending on a position where light passes through of the light interference region Ar0. In this case, therefore, since light in a predetermined wavelength range having a measurement target wavelength at the center is extracted, the full width at half maximum is increased and the resolution is reduced.

On the other hand, when the bending of the fixed reflective film 54 and the movable reflective film 55 is small, the size of the inter-reflective film gap G1 in the light interference region Ar0 is uniform. Therefore, the full width at half maximum is reduced, and the resolution is improved.

Figure 7:
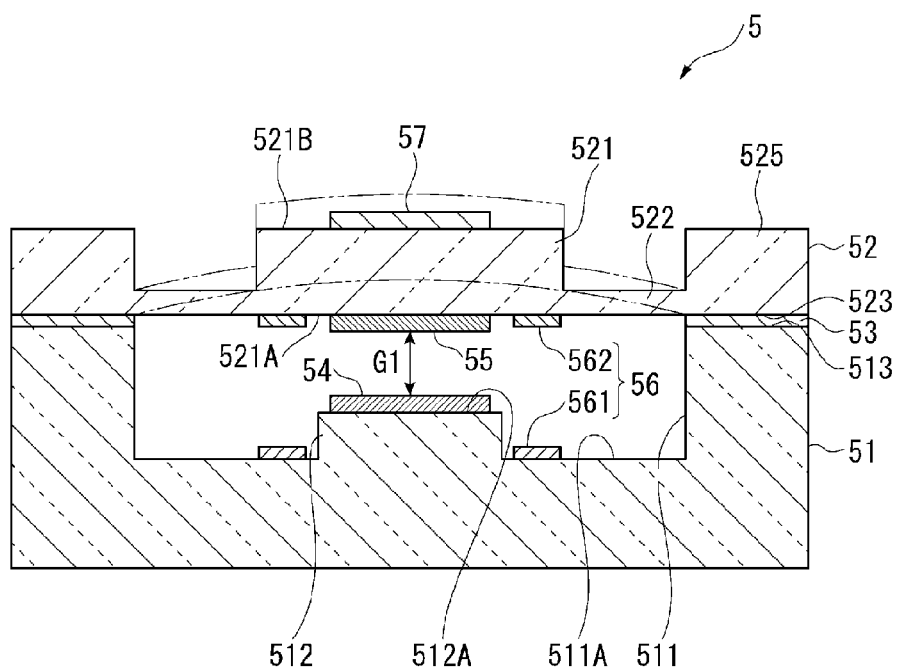
FIG. 7 is a diagram showing a bending state of a movable substrate when extracting light, which has a shortest measurement target wavelength in a measurement target wavelength range, using the wavelength tunable interference filter in the first embodiment.

FIG. 7 is a diagram showing a bending state of the movable substrate 52 when extracting light, which has a shortest measurement target wavelength in a measurement target wavelength range, using the wavelength tunable interference filter 5 in the present embodiment.

In the present embodiment, as shown in FIG. 3, the movable substrate 52 is curved in a convex shape in a direction away from the fixed substrate 51 in the initial state where the size of the inter-reflective film gap G1 is largest. That is, in the initial state, the movable reflective film 55 is curved. In addition, when the movable portion 521 is displaced to the fixed substrate 51 side by increasing the voltage applied to the electrostatic actuator 56, the bending of the movable portion 521 is reduced. In addition, in the present embodiment, when extracting the light having a predetermined shortest measurement target wavelength, that is, when a maximum voltage is applied to minimize the size of the inter-reflective film gap G1, the movable surface 521A of the movable portion 521 becomes flat and the fixed reflective film 54 and the movable reflective film 55 become parallel to each other as shown in FIG. 7.

Accordingly, assuming that the reflectance characteristics of the reflective film are uniform, when the inter-reflective film gap G1 is reduced from the initial state by applying a voltage to the electrostatic actuator 56 in the wavelength tunable interference filter 5 of the present embodiment, the full width at half maximum of transmitted light is changed as indicated by the arrow Y2 in FIG. 6.

Figure 8:
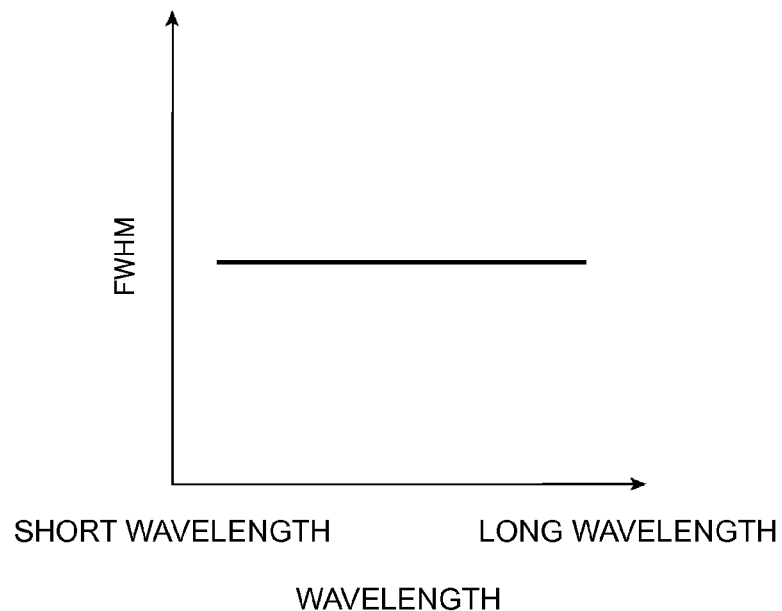
FIG. 8 is a diagram showing the optical characteristics (full width at half maximum) in the wavelength tunable interference filter of the first embodiment.

Here, in the present embodiment, the fixed reflective film 54 and the movable reflective film 55 have the reflectance characteristics shown in FIG. 4. Therefore, in the wavelength tunable interference filter 5 of the present embodiment, optical characteristics including the optical characteristics shown in FIGS. 5 and 6, that is, optical characteristics having a uniform full width at half maximum for each wavelength as shown in FIG. 8 are obtained. In addition, FIG. 8 is a diagram showing the optical characteristics (full width at half maximum) in the wavelength tunable interference filter 5 of the present embodiment.

In other words, in the present embodiment, as shown in FIG. 8, the amount of bending of the movable substrate 52 in the initial state is determined such that the full width at half maximum is constant for each wavelength in the measurement wavelength range as shown in FIG. 8, and the curve forming film 57 for curving the movable substrate 52 by the determined amount of bending is formed on the movable substrate 52. As a result, the wavelength tunable interference filter 5 can extract the light of each wavelength with uniform resolution in at least the measurement wavelength range.

Operations and Effects of the First Embodiment

In the wavelength tunable interference filter 5 of the present embodiment, the movable substrate 52 is curved in a direction away from the fixed substrate 51 in the initial state where no voltage is applied to the electrostatic actuator 56, and the size of the inter-reflective film gap is changed by displacing the movable portion 521 to the fixed substrate 51 side by applying a voltage to the electrostatic actuator 56. In addition, each of the fixed reflective film 54 and the movable reflective film 55 has reflectance characteristics in which the reflectance increases from the short wavelength side toward the long wavelength side.

In the wavelength tunable interference filter 5 having such a configuration, the movable reflective film 55 is bent in the initial state, and the amount of bending of the movable reflective film 55 decreases as the size of the inter-reflective film gap decreases. Therefore, by shifting the light extracted by the wavelength tunable interference filter 5 from the long wavelength side to the short wavelength side, the full width at half maximum of transmitted light is reduced and the resolution is increased. On the other hand, the reflectance of each of the reflective films 54 and 55 decreases from the long wavelength side toward the short wavelength side.

For this reason, in the wavelength tunable interference filter 5 of the present embodiment, it is possible to make the full width at half maximum uniform for each measurement target wavelength in the measurement wavelength range. That is, the wavelength tunable interference filter 5 can extract light with the same resolution regardless of a measurement target wavelength.

In addition, when the resolution differs depending on a wavelength, measurement error changes according to the measurement target wavelength, for example. In the present embodiment, however, the measurement error is also uniform. Accordingly, since the error can be easily corrected, it is possible to perform high-accuracy light amount detection and spectroscopic measurement.

In the present embodiment, the curve forming film 57 is provided on the movable substrate 52, and the movable substrate 52 is curved by the internal stress.

In such a configuration, the movable substrate 52 can be easily curved in a direction away from the fixed substrate 51 simply by forming the curve forming film 57 on the movable substrate 52. As a result, it is possible to simplify the configuration and improve the manufacturing efficiency.

In the present embodiment, the curve forming film 57 is provided in the light interference region Ar0 of the movable portion 521. For this reason, it is possible to curve the movable portion 521 around the position where the movable reflective film 55 is provided. In addition, since the curve forming film 57 has optical transparency with respect to the measurement wavelength range, it is possible to suppress the optical loss in the curve forming film 57. Accordingly, it is possible to suppress a reduction in the amount of light transmitted through the wavelength tunable interference filter 5.

In the present embodiment, the curve forming film 57 is provided on the outer surface 521B of the movable portion 521. In such a configuration, it is possible to prevent the charging of the movable substrate 52 by using a film material having an antistatic effect as the curve forming film 57. In addition, since neither the movable reflective film 55 nor the movable electrode 562 is provided on the outer surface 521B of the movable portion 521, the curve forming film 57 may be formed in a wide range. In such a configuration, since the thickness of the curve forming film 57 can be reduced, it is possible to further reduce the optical loss in the curve forming film 57.

Second Embodiment

Next, a second embodiment of the invention will be described below.

In the first embodiment described above, the configuration in which the curve forming film 57 is provided on the outer surface 521B of the movable portion 521 has been illustrated. On the other hand, the second embodiment is different from the first embodiment in that the curve forming film is provided on the movable surface 521A side of the movable portion 521.

Figure 9:
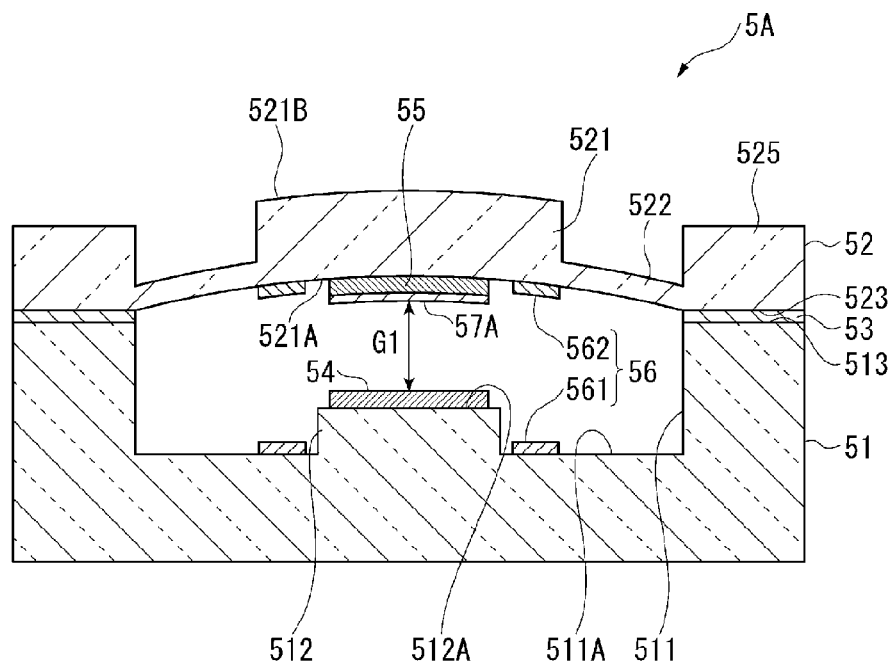
FIG. 9 is a cross-sectional view showing the schematic configuration of a wavelength tunable interference filter of a second embodiment of the invention.

FIG. 9 is a cross-sectional view showing the schematic configuration of a wavelength tunable interference filter 5A of the second embodiment. In addition, in explaining the subsequent embodiments, the same components as in the first embodiment are denoted by the same reference numerals, and explanation thereof will be omitted or simplified.

As shown in FIG. 9, in the present embodiment, a curve forming film 57A is formed so as to cover the movable reflective film 55 provided in the movable portion 521.

In this case, a film having a tensile stress is used as the curve forming film 57A. In addition, as described above, the amount of bending of the movable substrate 52 in the initial state is determined such that the wavelength tunable interference filter 5A has optical characteristics in which the full width at half maximum is constant for each wavelength in the measurement wavelength range, and a method of forming the curve forming film 57A to curve the movable substrate 52 or parameters, such as a film thickness, are set according to the determined amount of bending.

In such a configuration, since the curve forming film 57A can function as a protective film of the movable reflective film 55, it is possible to suppress the deterioration of the movable reflective film 55. In particular, this is effective when the movable reflective film 55 is formed of a material that easily deteriorates, such as an Ag metal film.

In addition, the curve forming film 57A may be formed of a conductive film, such as an ITO film. In this case, by connecting the curve forming film 57A to GND, the curve forming film 57A can be made to function as an antistatic electrode, for example. In addition, when each of the reflective films 54 and 55 is formed of a metal film or an alloy film or when a conductive film, such as an ITO film, is formed on the fixed reflective film 54, the curve forming film 57A and the fixed reflective film 54 may be made to function as electrodes for capacitance detection or may be made to function as driving electrodes.

Third Embodiment

Next, a third embodiment of the invention will be described below.

In the second embodiment described above, the configuration in which the surface of the movable reflective film 55 is covered by the curve forming film 57A has been illustrated. On the other hand, the third embodiment is different from the second embodiment in that the curve forming film is provided between the movable substrate 52 and the movable reflective film 55.

Figure 10:
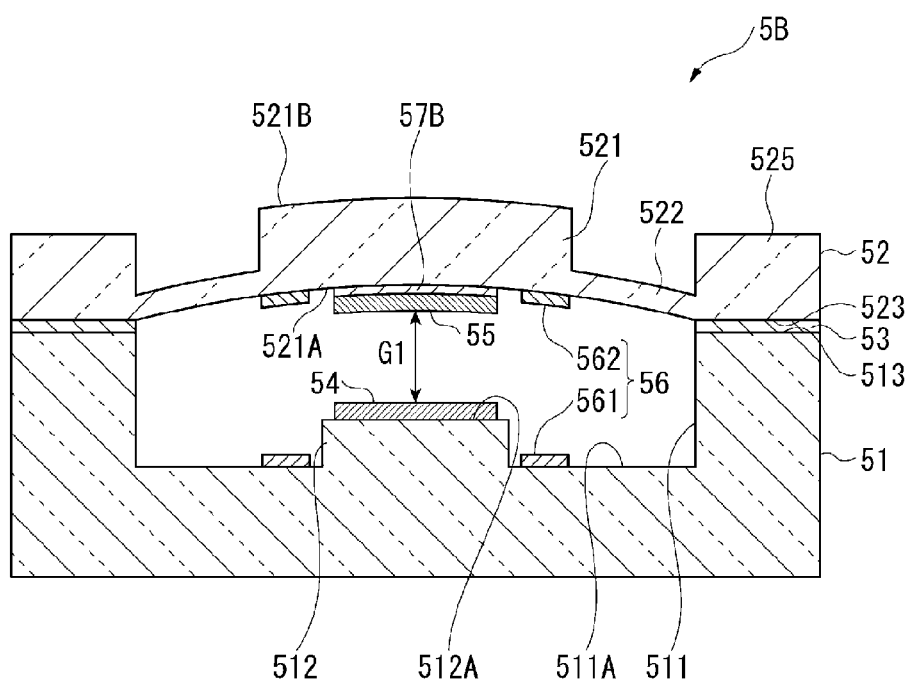
FIG. 10 is a cross-sectional view showing the schematic configuration of a wavelength tunable interference filter of a third embodiment of the invention.

FIG. 10 is a cross-sectional view showing the schematic configuration of a wavelength tunable interference filter 5B of the third embodiment.

As shown in FIG. 10, in the present embodiment, a curve forming film 57B is provided on the movable surface 521A of the movable portion 521, and the movable reflective film 55 is provided on the curve forming film 57B.

In this case, a film having a tensile stress is used as the curve forming film 57B as in the second embodiment. In this manner, it is possible to curve the movable substrate 52 in a convex shape in a direction away from the fixed substrate 51.

In addition, in the present embodiment, it is preferable to use a film material, which has high adhesion to the movable reflective film 55 and the movable substrate 52, as the curve forming film 57B. For example, when the movable reflective film 55 is formed of an alloy film, such as an Ag alloy film, or a metal film, such as an Ag metal film, it is preferable to use, for example, an ITO film, which is a metal oxide film, as the curve forming film 57B. In such a configuration, it is possible to suppress the peeling of the movable reflective film 55. In addition, as in the second embodiment, when the ITO film or the like is used, the curve forming film 57B can also function as an electrode.

Fourth Embodiment

Next, a fourth embodiment of the invention will be described below.

In the first embodiment described above, the configuration in which the curve forming film 57 is provided in the light interference region Ar0 on the outer surface 521B of the movable portion 521 or the configuration in which the entire outer surface 521B is covered by the curve forming film 57 has been illustrated.

On the other hand, the fourth embodiment is different from the first to third embodiments in that the curve forming film is provided outside the light interference region Ar0 of the movable portion 521.

Figure 11:
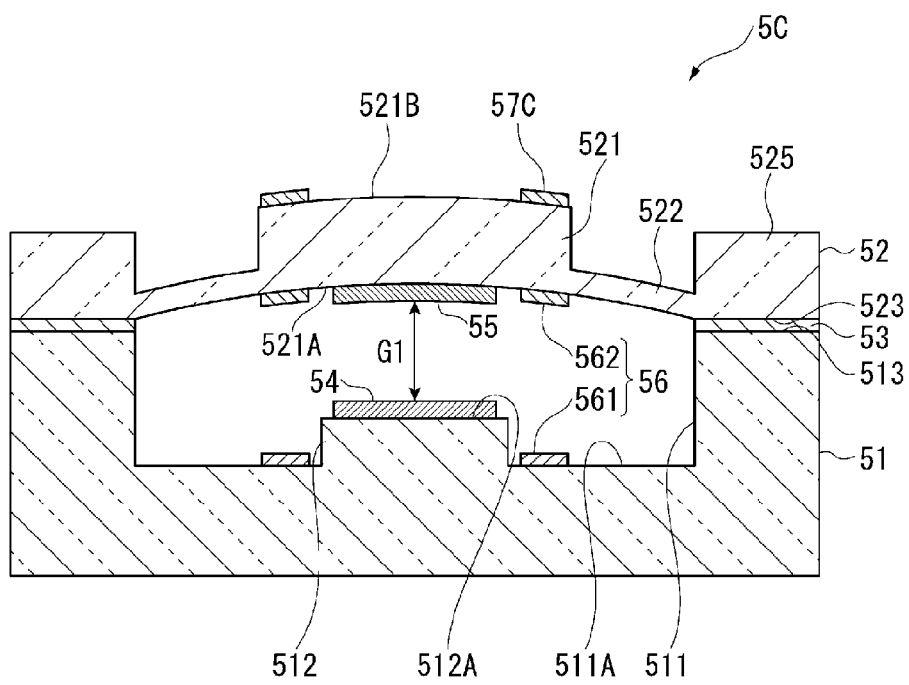
FIG. 11 is a cross-sectional view showing the schematic configuration of a wavelength tunable interference filter of a fourth embodiment of the invention.

FIG. 11 is a cross-sectional view showing the schematic configuration of a wavelength tunable interference filter 5C of the fourth embodiment.

As shown in FIG. 11, in the present embodiment, a curve forming film 57C is formed in an annular shape on the outer surface 521B of the movable portion 521. As the curve forming film 57C, a film material having a compressive stress is used as in the first embodiment. In this manner, it is possible to curve the movable substrate 52 in a convex shape in a direction away from the fixed substrate 51.

In addition, in the present embodiment, the curve forming film 57C is formed of a film material with no optical transparency, and the outer periphery of the light interference region Ar0 is defined by the annular inner peripheral edge. That is, since the curve forming film 57C of the present embodiment also functions as an aperture, it is possible to define a light passing area in the wavelength tunable interference filter 5C.

In addition, although the example where the annular curve forming film 57C is provided on the outer surface 521B of the movable portion 521 has been illustrated in the present embodiment, the curve forming film 57C may also be provided on the movable surface 521A side of the movable portion 521 as in the second and third embodiments. In this case, a film material having a tensile stress may be used as the curve forming film 57C. In addition, also in this case, the curve forming film 57C can be made to function as an aperture by defining the light interference region Ar0 by the annular inner peripheral edge using a film with no optical transparency as the curve forming film 57C.

In addition, the movable electrode 562 may also be made to function as the curve forming member according to the invention by forming the movable electrode 562 with a film material having a tensile stress. In this case, however, since the internal stress is also applied to the movable extraction electrode 564, it may be considered that the holding portion 522 will be curved asymmetrically with respect to the filter center point O. Therefore, in this case, it is preferable to form a film material having a compressive stress on the movable extraction electrode 564 in order to counteract the internal stress applied to the movable extraction electrode 564.

Fifth Embodiment

Next, a fifth embodiment of the invention will be described with reference to the accompanying drawings.

In the spectrometer 1 of the first embodiment described above, the wavelength tunable interference filter 5 is directly provided in the optical module 10. However, there is an optical module having a complicated configuration. In particular, it may be difficult to provide the wavelength tunable interference filter 5 directly in a small optical module. In the present embodiment, an optical filter device that enables the wavelength tunable interference filter 5 to be easily provided in such a small optical module will be described below.

Figure 12:
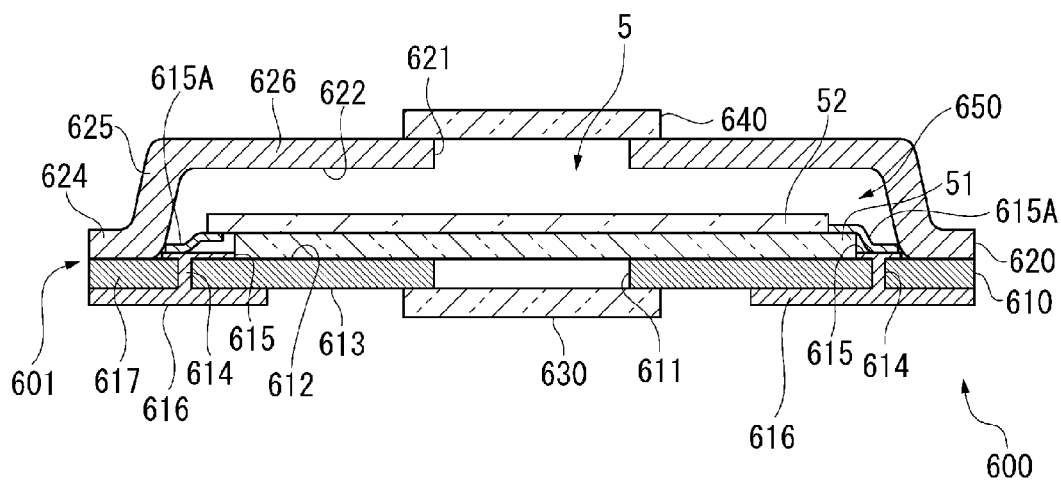
FIG. 12 is a cross-sectional view showing the schematic configuration of an optical filter device of a fifth embodiment of the invention.

FIG. 12 is a cross-sectional view showing the schematic configuration of an optical filter device of the fifth embodiment of the invention.

As shown in FIG. 12, an optical filter device 600 includes the wavelength tunable interference filter 5 and a housing 601 in which the wavelength tunable interference filter 5 is housed. In addition, wavelength tunable interference filters 5A, 5B, and 5C may be used instead of the wavelength tunable interference filter 5.

The housing 601 includes a base substrate 610, a lid 620, a base side glass substrate 630, and a lid side glass substrate 640.

The base substrate 610 is formed of a single layer ceramic substrate, for example. The fixed substrate 51 of the wavelength tunable interference filter 5 is provided on the base substrate 610. Regarding the arrangement of the fixed substrate 51 with respect to the base substrate 610, for example, the fixed substrate 51 may be disposed on the base substrate 610 with an adhesive layer interposed therebetween or may be disposed on the base substrate 610 by fitting to other fixed members. In addition, a light passing hole 611 is formed on the base substrate 610 so as to be open. In addition, the base side glass substrate 630 is bonded so as to cover the light passing hole 611. As examples of the method of bonding the base side glass substrate 630, it is possible to use a glass frit bonding method using a glass frit, which is a piece of glass obtained by dissolving a glass material at high temperature and quenching the glass material, and a bonding method using an epoxy resin or the like.

On a base inside surface 612 of the base substrate 610 facing the lid 620, an inside terminal portion 615 is provided corresponding to each of the extraction electrodes 563 and 564 of the wavelength tunable interference filter 5. In addition, connection between each of the extraction electrodes 563 and 564 and the inside terminal portion 615 can be made using, for example, FPC615A. For example, each of the extraction electrodes 563 and 564 and the inside terminal portion 615 are bonded to each other using Ag paste, an anisotropic conductive film (ACF), anisotropic conductive paste (ACP), and the like. In addition, the invention is not limited to the connection using FPC615A, and wire connection, such as wire bonding, may also be performed.

In addition, on the base substrate 610, a through hole 614 is formed corresponding to the position where each inside terminal portion 615 is provided. Each inside terminal portion 615 is connected to an outside terminal portion 616, which is provided on a base outside surface 613 of the base substrate 610 opposite the base inside surface 612, through a conductive member filled in the through hole 614.

In addition, a base bonding portion 617 bonded to the lid 620 is provided on the outer periphery of the base substrate 610.

As shown in FIG. 12, the lid 620 includes a lid bonding portion 624 bonded to the base bonding portion 617 of the base substrate 610, a side wall portion 625 that is continuous from the lid bonding portion 624 and rises in a direction away from the base substrate 610, and a top surface portion 626 that is continuous from the side wall portion 625 and covers the movable substrate 52 side of the wavelength tunable interference filter 5. The lid 620 can be formed of, for example, metal or alloy, such as Kovar.

The lid 620 is closely bonded to the base substrate 610 since the lid bonding portion 624 and the base bonding portion 617 of the base substrate 610 are bonded to each other.

As examples of the bonding method, not only laser welding but also soldering using silver solder, sealing using an eutectic alloy layer, welding using low-melting-point glass, glass adhesion, glass frit bonding, and bonding using epoxy resin can be mentioned. These bonding methods can be appropriately selected according to the material, bonding environment, and the like of the base substrate 610 and the lid 620.

The top surface portion 626 of the lid 620 is parallel to the base substrate 610. A light passing hole 621 is formed on the top surface portion 626 so as to be open. In addition, the lid side glass substrate 640 is bonded so as to cover the light passing hole 621. As examples of the method of bonding the lid side glass substrate 640, it is possible to use a glass frit bonding method and a bonding method using an epoxy resin or the like similar to the bonding of the base side glass substrate 630.

In the optical filter device 600 of the present embodiment described above, since the wavelength tunable interference filter 5 is protected by the housing 601, it is possible to prevent damage to the wavelength tunable interference filter 5 due to external factors. In addition, since the inside of the optical filter device 600 is sealed, it is possible to suppress the penetration of foreign matter, such as water droplets or charged substances. Accordingly, it is also possible to suppress the adhesion of the foreign matter to the fixed reflective film 54 or the movable reflective film 55.

Other Embodiments

In addition, the invention is not limited to the embodiments described above, but various modifications or improvements may be made without departing from the scope and spirit of the invention.

In the respective embodiments described above, the configuration has been illustrated in which the curve forming films 57, 57A, 57B, and 57C are provided in order to curve the movable substrate 52. However, the invention is not limited thereto.

For example, the movable substrate 52 may be formed in a curved shape by etching or pressing when forming the movable substrate 52.

In addition, in the optical filter device 600 of the fifth embodiment, for example, the movable substrate 52 may be curved by sealing the electrode extraction groove 511B with a sealing member to form the space between the fixed substrate 51 and the movable substrate 52 as an enclosed space and making the pressure inside the housing 601 lower than the pressure of the enclosed space between the fixed substrate 51 and the movable substrate 52.

In addition, although the curve forming films 57, 57A, 57B, and 57C to curve the movable substrate 52 with internal stress have been illustrated as curve forming portions, the curve forming portion is not limited thereto. For example, in a natural state, a flexible member curved in a convex shape may be fixed to the outer surface 521B of the movable substrate 52, and the movable substrate 52 may be curved along the curved shape of the flexible member.

In addition, the movable reflective film 55 or the movable electrode 562 may also be made to function as a curve forming portion according to the invention. For example, it is also possible to form the movable reflective film 55 or the movable electrode 562 using a film material having an internal stress (tensile stress) and curve the movable substrate 52 in a convex shape in a direction away from the fixed substrate 51 by the internal stress.

Although the configuration in which the movable substrate 52 includes the movable portion 521 and the holding portion 522 has been illustrated in each of the embodiments described above, the invention is not limited thereto. For example, the movable substrate 52 may be formed in a plate shape having a uniform thickness. In this case, the entire movable substrate 52 can be bent by the curve forming films 57, 57A, 57B, and 57C. That is, in a configuration including the movable portion 521 and the holding portion 522, the bending of the movable portion 521 with respect to the holding portion 522 is difficult. For this reason, the bending of the movable reflective film 55 is also suppressed. Accordingly, in order to sufficiently curve the movable reflective film 55, it is desirable to increase the stress of the curve forming films 57, 57A, 57B, and 57C. On the other hand, in a configuration in which the holding portion 522 is not provided, the movable reflective film 55 can be easily curved by curving the movable substrate 52 slightly. In this case, however, it is difficult to displace the movable substrate 52 compared with a configuration in which the holding portion 522 is provided. Accordingly, when changing the size of the inter-reflective film gap using the electrostatic actuator 56, it is desirable to apply a larger voltage.

Although the configuration in which the curve forming films 57, 57A, 57B, and 57C are provided in the movable portion 521 has been illustrated in the respective embodiments described above, it is also possible to adopt a configuration in which the curve forming films 57, 57A, 57B, and 57C are provided in the holding portion 522 or a configuration in which the curve forming films 57, 57A, 57B, and 57C are provided in both the movable portion 521 and the holding portion 522. However, since the thickness of the holding portion 522 is increased due to providing the curve forming films 57, 57A, 57B, and 57C in the holding portion 522, it is desirable to apply a larger voltage when changing the size of the inter-reflective film gap using the electrostatic actuator 56.

In addition, in the embodiments described above, the configuration has been illustrated in which the curve forming films 57, 57A, 57B, and 57C are provided on one of the movable surface 521A and the outer surface 521B of the movable portion 521. However, for example, the curve forming films 57, 57A, 57B, and 57C may also be provided on both the movable surface 521A and the outer surface 521B.

In the embodiment described above, the electrostatic actuator 56 formed by the fixed electrode 561 and the movable electrode 562 has been illustrated as a gap change portion. However, the invention is not limited thereto.

For example, a dielectric actuator, which is formed by a first dielectric coil provided on the fixed substrate 51 and a second dielectric coil or a permanent magnet provided on the movable substrate 52, may be used as a gap change portion.

In addition, a piezoelectric actuator may be used instead of the electrostatic actuator 56. In this case, the holding portion 522 can be bent, for example, by laminating a lower electrode layer, a piezoelectric layer, and an upper electrode layer on the holding portion 522 and expanding and contracting the piezoelectric layer by changing the voltage, which is applied between the lower electrode layer and the upper electrode layer, as an input value.

In addition, for example, a configuration of adjusting the size of the inter-reflective film gap G1 by changing the air pressure between the fixed substrate 51 and the movable substrate 52 can also be exemplified without being limited to the configuration in which the size of the inter-reflective film gap G1 is changed by voltage application.

In addition, in each embodiment described above, the spectrometer 1 has been exemplified as the electronic apparatus according to the invention. However, the wavelength tunable interference filter 5, the optical module, and the electronic apparatus according to the invention can be applied in various fields.

Figure 13:
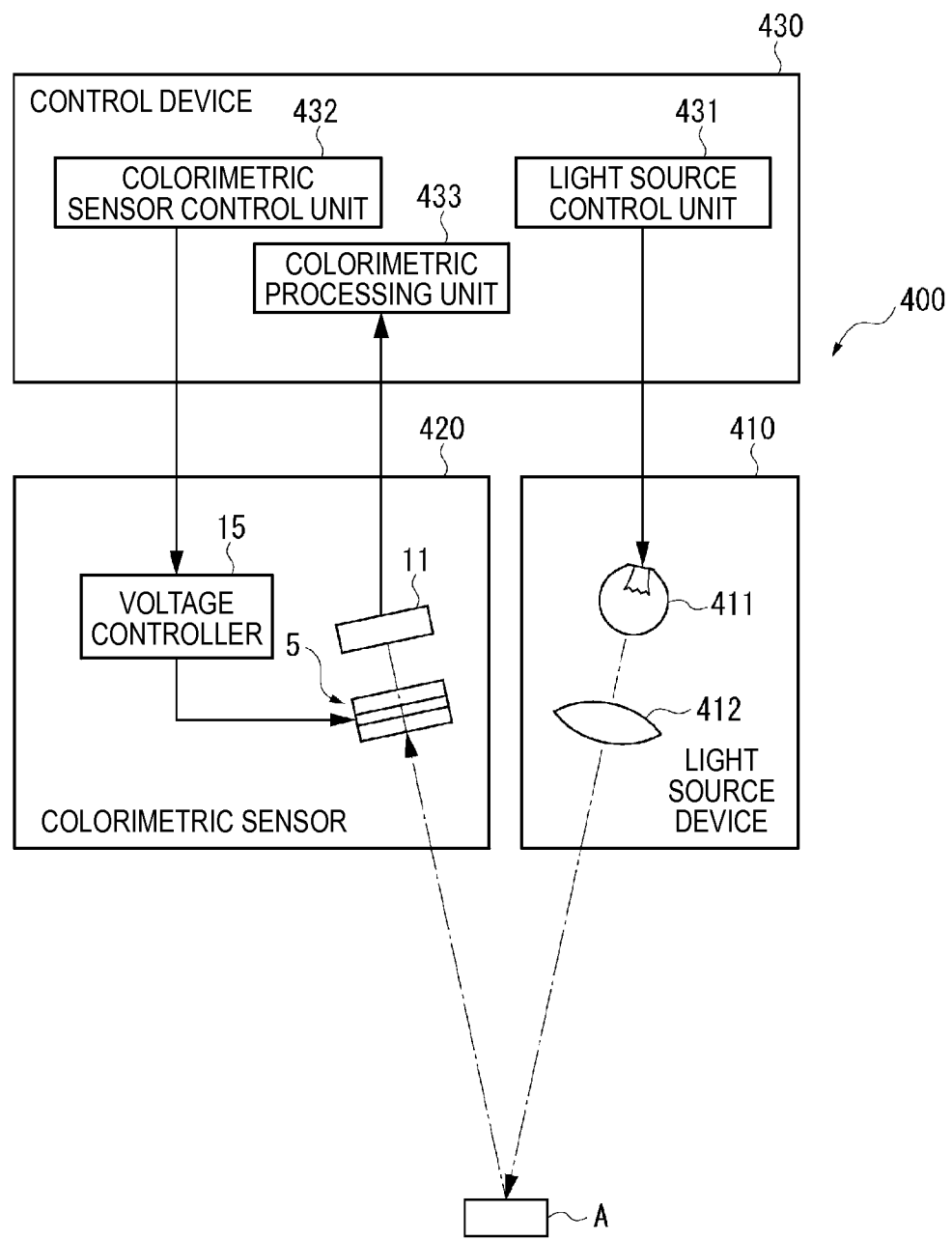
FIG. 13 is a block diagram showing an example of a colorimetric apparatus that is an electronic apparatus according to the invention.

For example, as shown in FIG. 13, the electronic apparatus according to the invention can also be applied to a colorimetric apparatus for measuring color.

FIG. 13 is a block diagram showing an example of a colorimetric apparatus 400 including the wavelength tunable interference filter 5.

As shown in FIG. 13, the colorimetric apparatus 400 includes a light source device 410 that emits light to a test target A, a colorimetric sensor 420 (optical module), and a control device 430 (control unit) that controls the overall operation of the colorimetric apparatus 400. In addition, the colorimetric apparatus 400 is an apparatus that reflects light emitted from the light source device 410 by the test target A, receives the reflected light to be examined using the colorimetric sensor 420, and analyzes and measures the chromaticity of the light to be examined, that is, the color of the test target A, on the basis of a detection signal output from the colorimetric sensor 420.

The light source device 410 includes a light source 411 and a plurality of lenses 412 (only one lens is shown in FIG. 13), and emits reference light (for example, white light) to the test target A. In addition, a collimator lens may be included in the plurality of lenses 412. In this case, the light source device 410 forms the reference light emitted from the light source 411 as parallel light using the collimator lens and emits the parallel light from a projection lens (not shown) toward the test target A. In addition, although the colorimetric apparatus 400 including the light source device 410 has been illustrated in the present embodiment, the light source device 410 may not be provided, for example, when the test target A is a light emitting member, such as a liquid crystal panel.

As shown in FIG. 13, the colorimetric sensor 420 includes the wavelength tunable interference filter 5, the detector 11 that receives light transmitted through the wavelength tunable interference filter 5, and the voltage controller 15 that controls a voltage applied to the electrostatic actuator 56 of the wavelength tunable interference filter 5. In addition, instead of the wavelength tunable interference filter 5, the wavelength tunable interference filters 5A, 5B, and 5C may be used, or the optical filter device 600 may be used. In addition, the colorimetric sensor 420 includes an incident optical lens (not shown) that is provided at a position facing the wavelength tunable interference filter 5 and that guides reflected light (light to be examined), which is reflected by the test target A, to the inside. In addition, the colorimetric sensor 420 separates light with a predetermined wavelength, among light beams to be examined incident from the incident optical lens, using the wavelength tunable interference filter 5 and receives the separated light using the detector 11.

The control device 430 serves as a control unit in the embodiment of the invention, and controls the overall operation of the colorimetric apparatus 400.

As the control device 430, for example, a general-purpose personal computer, a personal digital assistant, and a computer dedicated to color measurement can be used. In addition, as shown in FIG. 13, the control device 430 is configured to include a light source control unit 431, a colorimetric sensor control unit 432, and a colorimetric processing unit 433.

The light source control unit 431 is connected to the light source device 410, and outputs a predetermined control signal to the light source device 410 on the basis of, for example, a setting input from the user so that white light with predetermined brightness is emitted from the light source device 410.

The colorimetric sensor control unit 432 is connected to the colorimetric sensor 420, and sets a wavelength of light received by the colorimetric sensor 420 on the basis of, for example, a setting input from the user and outputs to the colorimetric sensor 420 a control signal to detect the amount of received light with the wavelength. Then, the voltage controller 15 of the colorimetric sensor 420 applies a voltage to the electrostatic actuator 56 on the basis of the control signal, thereby driving the wavelength tunable interference filter 5.

The colorimetric processing unit 433 analyzes the chromaticity of the test target A from the amount of received light detected by the detector 11. In addition, as in the first and second embodiments, the colorimetric processing unit 433 may analyze the chromaticity of the test target A by estimating a spectrum S using an estimation matrix Ms with the amount of light obtained by the detector 11 as a measurement spectrum D.

In addition, as another example of the electronic apparatus of the invention, a light-based system for detecting the presence of a specific material can be mentioned. As examples of such a system, an in-vehicle gas leak detector that performs high-sensitivity detection of a specific gas by adopting a spectroscopic measurement method using the wavelength tunable interference filter 5 according to the invention or a gas detector, such as a photoacoustic rare gas detector for breast test, can be exemplified.

An example of such a gas detector will now be described with reference to the accompanying drawings.

Figure 14:
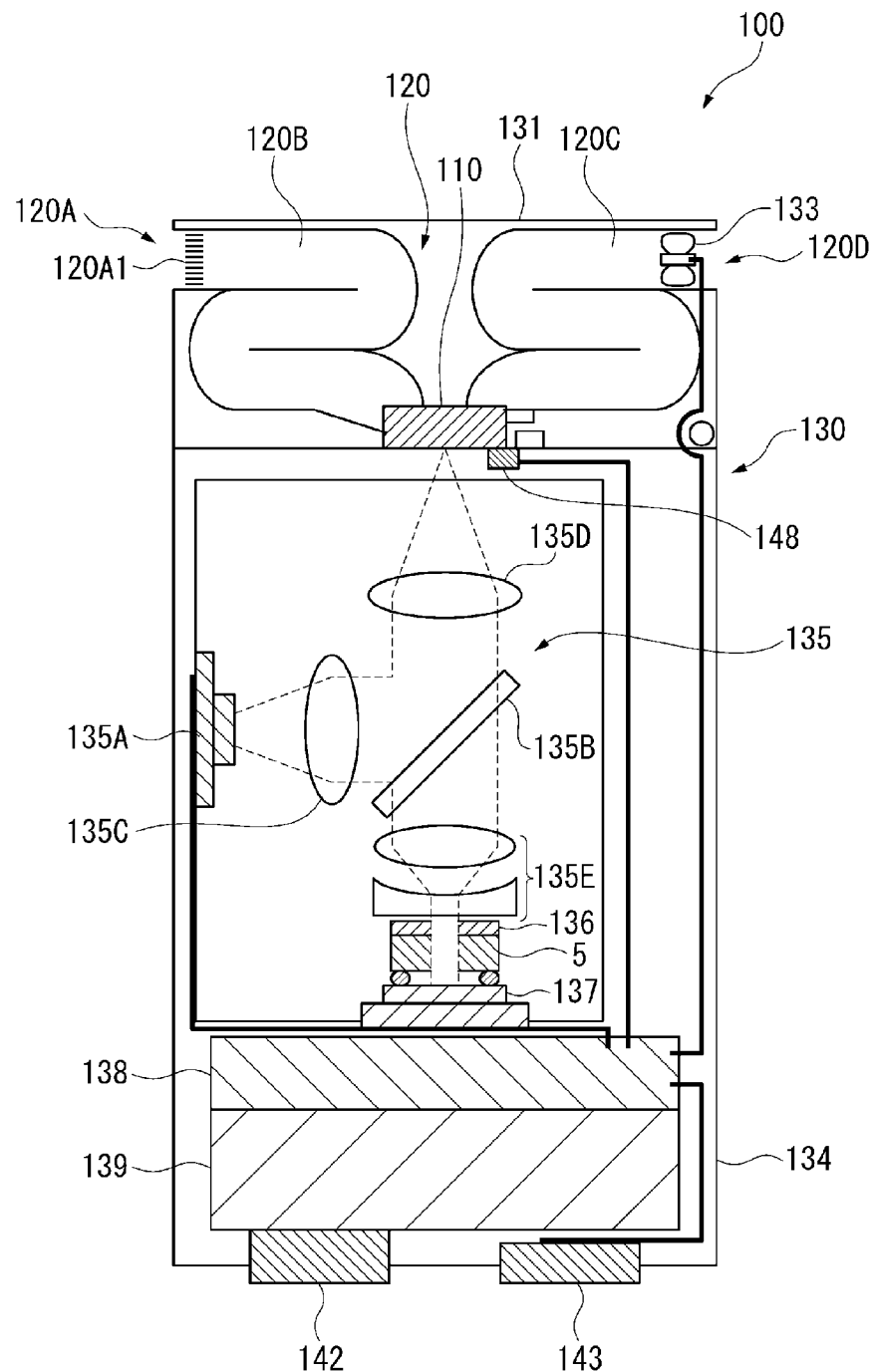
FIG. 14 is a schematic diagram showing an example of a gas detector that is an electronic apparatus according to the invention.

FIG. 14 is a schematic diagram showing an example of a gas detector including the wavelength tunable interference filter 5.

Figure 15:
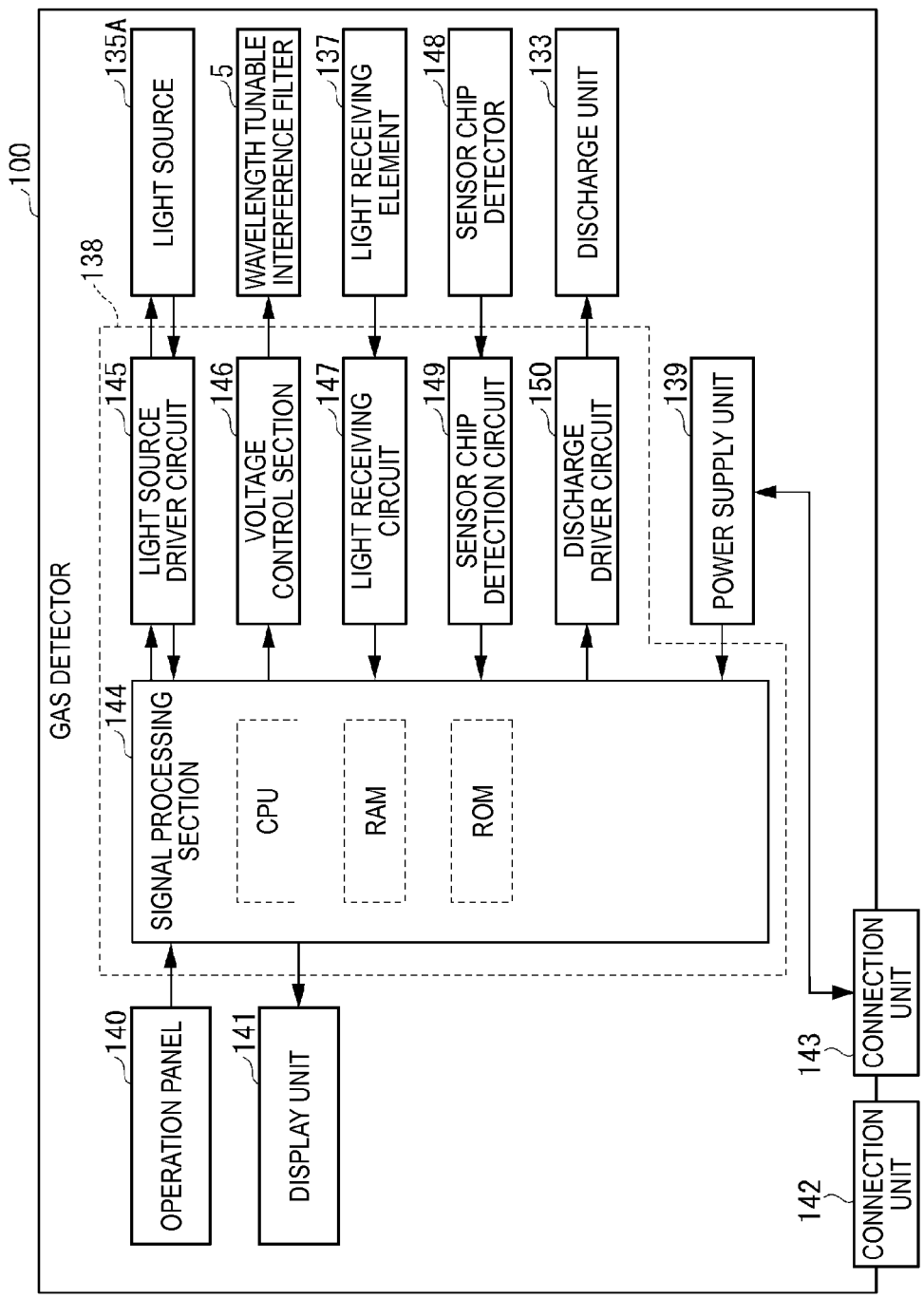
FIG. 15 is a block diagram showing the configuration of a control system of the gas detector shown in FIG. 14.

FIG. 15 is a block diagram showing the configuration of a control system of the gas detector shown in FIG. 14.

As shown in FIG. 14, a gas detector 100 is configured to include: a sensor chip 110; a flow path 120 including a suction port 120A, a suction flow path 120B, a discharge flow path 120C, and a discharge port 120D; and a main body 130.

The main body 130 is configured to include: a detection device including a sensor unit cover 131 having an opening through which the flow path 120 can be attached or detached, a discharge unit 133, a housing 134, an optical unit 135, a filter 136, the wavelength tunable interference filter 5, and a light receiving element 137 (detection unit); a control unit 138 that processes a detected signal and controls the detection unit; and a power supply unit 139 that supplies electric power. In addition, instead of the wavelength tunable interference filter 5, the wavelength tunable interference filters 5A, 5B, and 5C may be used, or the optical filter device 600 may be used. In addition, the optical unit 135 is configured to include a light source 135A that emits light, a beam splitter 135B that reflects the light incident from the light source 135A toward the sensor chip 110 side and transmits the light incident from the sensor chip side toward the light receiving element 137 side, and lenses 135C, 135D, and 135E.

In addition, as shown in FIG. 15, an operation panel 140, a display unit 141, a connection unit 142 for interface with the outside, and the power supply unit 139 are provided on the surface of the gas detector 100. When the power supply unit 139 is a secondary battery, a connection unit 143 for charging may be provided.

In addition, as shown in FIG. 15, the control unit 138 of the gas detector 100 includes a signal processing section 144 formed by a CPU or the like, a light source driver circuit 145 for controlling the light source 135A, a voltage control section 146 for controlling the wavelength tunable interference filter 5, a light receiving circuit 147 that receives a signal from the light receiving element 137, a sensor chip detection circuit 149 that reads a code of the sensor chip 110 and receives a signal from a sensor chip detector 148 that detects the presence of the sensor chip 110, and a discharge driver circuit 150 that controls the discharge unit 133. In addition, a storage unit (not shown) that stores V-λ data is provided in the gas detector 100.

Next, the operation of the above gas detector 100 will be described below.

The sensor chip detector 148 is provided inside the sensor unit cover 131 located in the upper portion of the main body 130, and the presence of the sensor chip 110 is detected by the sensor chip detector 148. When a detection signal from the sensor chip detector 148 is detected, the signal processing section 144 determines that the sensor chip 110 is mounted, and outputs a display signal to display "detection operation is executable" on the display unit 141.

Then, for example, when the operation panel 140 is operated by the user and an instruction signal indicating the start of detection processing is output from the operation panel 140 to the signal processing section 144, the signal processing section 144 first outputs a signal for operating the light source to the light source driver circuit 145 to operate the light source 135A. When the light source 135A is driven, linearly-polarized stable laser light with a single wavelength is emitted from the light source 135A. In addition, a temperature sensor or a light amount sensor is provided in the light source 135A, and the information is output to the signal processing section 144. In addition, when it is determined that the light source 135A is stably operating on the basis of the temperature or the amount of light input from the light source 135A, the signal processing section 144 operates the discharge unit 133 by controlling the discharge driver circuit 150. Then, a gas sample containing a target material (gas molecules) to be detected is guided from the suction port 120A to the suction flow path 120B, the inside of the sensor chip 110, the discharge flow path 120C, and the discharge port 120D. In addition, a dust filter 120A1 is provided on the suction port 120A in order to remove relatively large dust particles, some water vapor, and the like.

In addition, the sensor chip 110 is a sensor in which a plurality of metal nanostructures are included and which uses localized surface plasmon resonance. In such a sensor chip 110, an enhanced electric field is formed between the metal nanostructures by laser light. When gas molecules enter the enhanced electric field, Rayleigh scattered light and Raman scattered light including the information of molecular vibration are generated.

Such Rayleigh scattered light or Raman scattered light is incident on the filter 136 through the optical unit 135, and the Rayleigh scattered light is separated by the filter 136 and the Raman scattered light is incident on the wavelength tunable interference filter 5. In addition, the signal processing section 144 outputs a control signal to the voltage control section 146. Then, as shown in the first embodiment described above, the voltage control section 146 reads a voltage value corresponding to the measurement target wavelength from the storage unit, applies the voltage to the electrostatic actuator 56 of the wavelength tunable interference filter 5, and separates the Raman scattered light corresponding to gas molecules to be detected using the wavelength tunable interference filter 5. Then, when the separated light is received by the light receiving element 137, a light receiving signal corresponding to the amount of received light is output to the signal processing section 144 through the light receiving circuit 147. In this case, the target Raman scattered light can be accurately extracted from the wavelength tunable interference filter 5.

The signal processing section 144 determines whether or not the gas molecules to be detected obtained as described above are target gas molecules by comparing the spectral data of the Raman scattered light corresponding to the gas molecules to be detected with the data stored in the ROM, and specifies the material. In addition, the signal processing section 144 displays the result information on the display unit 141, or outputs the result information to the outside through the connection unit 142.

In addition, in FIGS. 14 and 15, the gas detector 100 that separates Raman scattered light using the wavelength tunable interference filter 5 and detects gas from the separated Raman scattered light has been illustrated. However, as a gas detector, it is also possible to use a gas detector that specifies the type of gas by detecting the gas-specific absorbance. In this case, a gas sensor that detects light absorbed by gas, among incident light, after making gas flow into the sensor is used as the optical module according to the invention. In addition, a gas detector that analyzes and determines gas, which flows into the sensor by the gas sensor, is used as the electronic apparatus according to the invention. In such a configuration, it is possible to detect the components of the gas using the wavelength tunable interference filter 5.

In addition, as a system for detecting the presence of a specific material, a material component analyzer, such as a non-invasive measuring apparatus for obtaining information regarding sugar using near-infrared spectroscopy or a non-invasive measuring apparatus for obtaining information regarding food, minerals, the body, and the like can be exemplified without being limited to the gas detection described above.

Hereinafter, a food analyzer will be described as an example of the material component analyzer.

Figure 16:
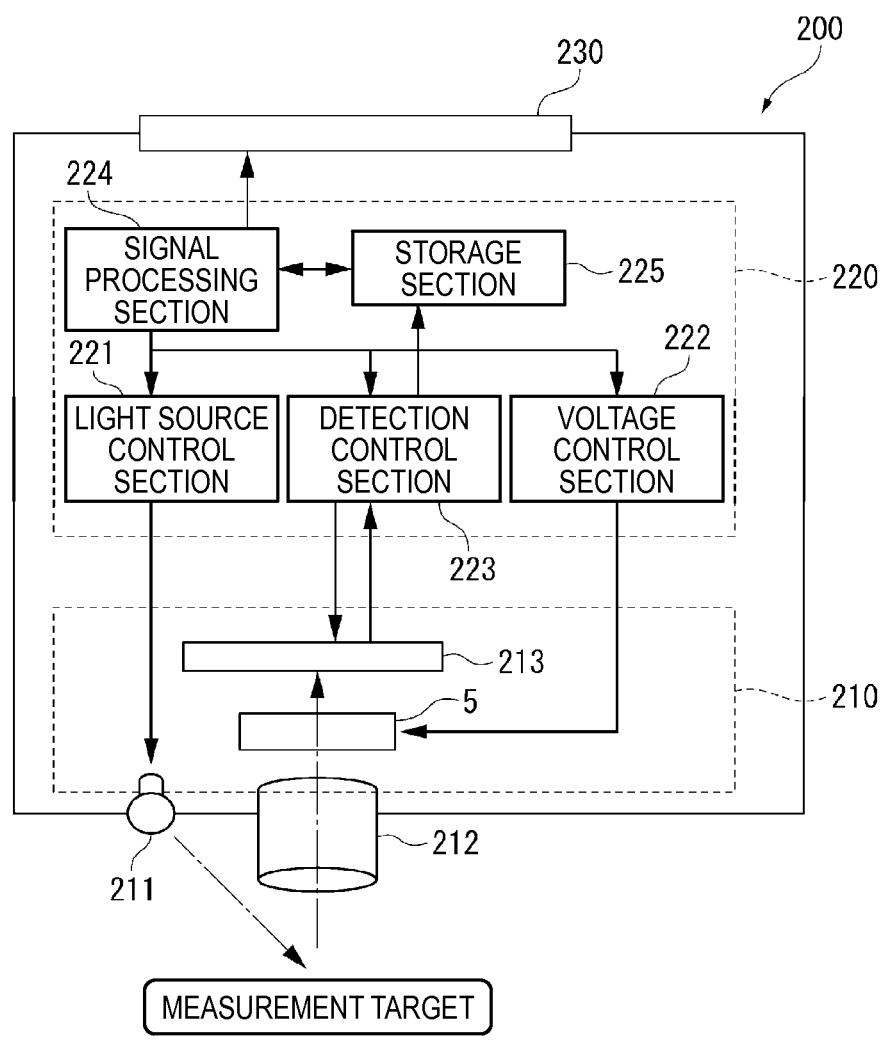
FIG. 16 is a diagram showing the schematic configuration of a food analyzer that is an electronic apparatus according to the invention.

FIG. 16 is a drawing showing the schematic configuration of a food analyzer that is an example of an electronic apparatus using the wavelength tunable interference filter 5.

As shown in FIG. 16, a food analyzer 200 includes a detector 210 (optical module), a control unit 220, and a display unit 230. The detector 210 includes a light source 211 that emits light, an imaging lens 212 to which light from a measurement object is introduced, the wavelength tunable interference filter 5 that separates the light introduced to the imaging lens 212, and an imaging unit 213 (detection unit) that detects the separated light. In addition, instead of the wavelength tunable interference filter 5, the wavelength tunable interference filters 5A, 5B, and 5C may be used, or the optical filter device 600 may be used.

In addition, the control unit 220 includes a light source control section 221 that performs ON/OFF control of the light source 211 and brightness control at the time of lighting, a voltage control section 222 that controls the wavelength tunable interference filter 5, a detection control section 223 that controls the imaging unit 213 and acquires a spectral image captured by the imaging unit 213, a signal processing section 224, and a storage section 225.

In the food analyzer 200, when the system is driven, the light source control section 221 controls the light source 211 so that light is emitted from the light source 211 to the measurement target. Then, light reflected by the measurement target is incident on the wavelength tunable interference filter 5 through the imaging lens 212. By the control of the voltage control section 222, the wavelength tunable interference filter 5 is driven according to the driving method shown in the first or second embodiment. Therefore, light with a desired wavelength can be accurately extracted from the wavelength tunable interference filter 5. In addition, the extracted light can be imaged by the imaging unit 213 formed by a CCD camera, for example. In addition, the imaged light is stored in the storage section 225 as a spectral image. In addition, the signal processing section 224 changes the value of a voltage applied to the wavelength tunable interference filter 5 by controlling the voltage control section 222, thereby obtaining a spectral image for each wavelength.

Then, the signal processing section 224 calculates a spectrum in each pixel by performing arithmetic processing on the data of each pixel in each image stored in the storage section 225. In addition, for example, information regarding the components of the food for the spectrum is stored in the storage section 225. The signal processing section 224 analyzes the data of the obtained spectrum on the basis of the information regarding the food stored in the storage section 225, and calculates food components contained in the detection target and the content. In addition, food calories, freshness, and the like can be calculated from the obtained food components and content. In addition, by analyzing the spectral distribution in the image, it is possible to extract a portion, of which freshness is decreasing, in the food to be examined. In addition, it is also possible to detect foreign matter contained in the food.

Then, the signal processing section 224 performs processing for displaying the information obtained as described above, such as the components or the content of the food to be examined and the calories or freshness of the food to be examined, on the display unit 230.

In addition, although an example of the food analyzer 200 is shown in FIG. 16, the invention can also be used as a non-invasive measuring apparatus for obtaining the information other than that described above by applying substantially the same configuration. For example, the invention can be applied to a biological analyzer for the analysis of biological components involving the measurement and analysis of body fluids, such as blood. For example, if an apparatus that detects ethyl alcohol is used as the apparatus for measuring the body fluids, such as blood, the biological analyzer can be used as a drunk driving prevention apparatus that detects the drinking level of the driver. In addition, the invention can also be applied to an electronic endoscope system including such a biological analyzer.

In addition, the invention can also be applied to a mineral analyzer for analyzing the components of minerals.

In addition, the wavelength tunable interference filter, the optical module, and the electronic apparatus of the invention can be applied to the following apparatuses.

For example, it is possible to transmit data with light of each wavelength by changing the intensity of light of each wavelength with time. In this case, data transmitted by light with a specific wavelength can be extracted by separating the light with a specific wavelength using the wavelength tunable interference filter 5 provided in the optical module and receiving the light with a specific wavelength using a light receiving unit. By processing the data of light of each wavelength using an electronic apparatus including such an optical module for data extraction, it is also possible to perform optical communication.

In addition, the electronic apparatus of the invention can also be applied to a spectral camera, a spectral analyzer, and the like for capturing a spectral image by separating light using the wavelength tunable interference filter according to the invention. As an example of such a spectral camera, an infrared camera including the wavelength tunable interference filter 5 can be mentioned.

Figure 17:
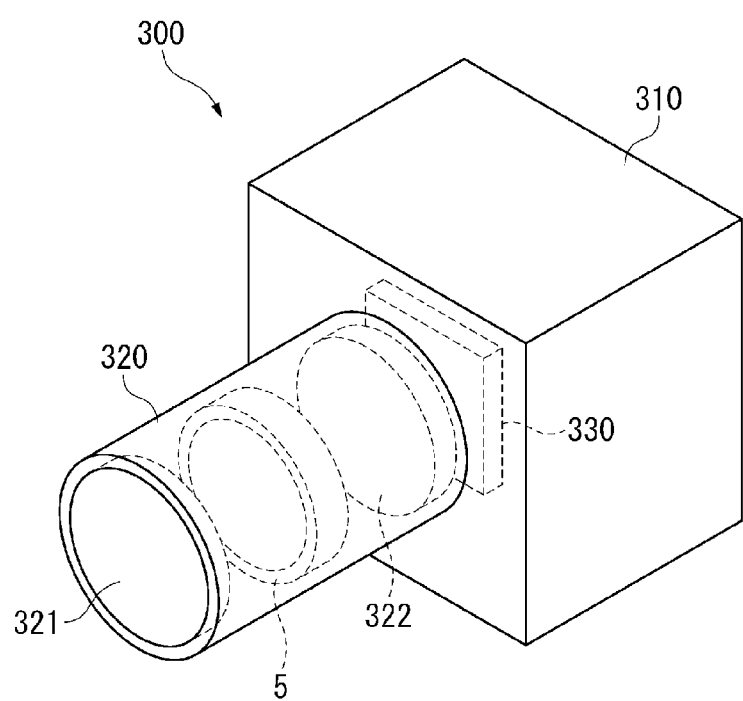
FIG. 17 is a diagram showing the schematic configuration of a spectral camera that is an electronic apparatus according to the invention.

FIG. 17 is a schematic diagram showing the configuration of a spectral camera. As shown in FIG. 17, a spectral camera 300 includes a camera body 310, an imaging lens unit 320, and an imaging unit 330 (detection unit).

The camera body 310 is a portion gripped and operated by the user.

The imaging lens unit 320 is provided on the camera body 310, and guides incident image light to the imaging unit 330. In addition, as shown in FIG. 17, the imaging lens unit 320 is configured to include an objective lens 321, an imaging lens 322, and the wavelength tunable interference filter 5 provided between these lenses.

The imaging unit 330 is formed of a light receiving element, and images the image light guided by the imaging lens unit 320.

In the spectral camera 300, a spectral image of light with a desired wavelength can be captured by transmitting the light with a wavelength to be imaged using the wavelength tunable interference filter 5.

In addition, the wavelength tunable interference filter according to the invention may be used as a band pass filter. For example, the wavelength tunable interference filter 5 according to the invention can be used as an optical laser device that separates and transmits only light in a narrow band having a predetermined wavelength at the center of light in a predetermined wavelength range emitted from a light emitting element.

In addition, the wavelength tunable interference filter according to the invention may be used as a biometric authentication device. For example, the wavelength tunable interference filter according to the invention can also be applied to authentication devices using blood vessels, fingerprints, a retina, and an iris using light in a near infrared region or a visible region.

In addition, the optical module and the electronic apparatus can be used as a concentration detector. In this case, using the wavelength tunable interference filter 5, infrared energy (infrared light) emitted from a material is separated and analyzed, and the analyte concentration in a sample is measured.

As described above, the wavelength tunable interference filter, the optical module, and the electronic apparatus according to the invention can be applied to any apparatus that separates predetermined light from incident light. In addition, since the wavelength tunable interference filter according to the invention can separate light beams with a plurality of wavelengths using one device as described above, measurement of the spectrum of a plurality of wavelengths, and detection of a plurality of components can be accurately performed. Accordingly, compared with a known apparatus that extracts a desired wavelength using a plurality of devices, it is possible to make an optical module or an electronic apparatus small. Therefore, the wavelength tunable interference filter according to the invention can be appropriately used as a portable optical device or an optical device for a vehicle, for example.

In addition, the specific structure when implementing the invention can be appropriately changed to other structures in a range where the object of the invention can be achieved.

The entire disclosure of Japanese Patent Application No. 2012-221028 filed on Oct. 3, 2012 is expressly incorporated by reference herein.

What is claimed is:

1. A wavelength tunable interference filter, comprising:
   a first substrate;
   a second substrate disposed so as to face the first substrate;
   a first reflective film that is provided on the first substrate;
   a second reflective film that is provided on the second substrate, is disposed so as to face the first reflective film; and
   a gap change portion that changes a size of a gap between the first and second reflective films by bending the second substrate to a side of the first substrate,
   wherein, in an initial state where the size of the gap is not changed by the gap change portion, the second substrate is curved so as to be convex on an opposite side to a side where the first substrate is disposed, and
   a first reflectance of each of the first and second reflective films at a first wavelength in a visible wavelength range is lower than a second reflectance of each of the first and second reflective films at a second wavelength longer than the first wavelength in the visible wavelength range; and
   a curve forming portion is provided on the second substrate and curves the second substrate to the opposite side to the side where the first substrate is disposed.

2. The wavelength tunable interference filter according to claim 1, wherein the curve forming portion is a film-like member, and curves the second substrate with internal stress, which is generated in the curve forming portion, in the initial state.

3. The wavelength tunable interference filter according to claim 1,
wherein the curve forming portion has optical transparency for light in a wavelength range selected by interference of light beams incident between the first and second reflective films, and is provided in a light interference region, in which the first and second reflective films overlap each other, in plan view.

4. The wavelength tunable interference filter according to claim 1,
wherein the curve forming portion is provided on a surface of the second substrate not facing the first substrate.

5. The wavelength tunable interference filter according to claim 1,
wherein the curve forming portion is disposed so as to cover the second reflective film provided on a surface of the second substrate facing the first substrate.

6. The wavelength tunable interference filter according to claim 1,
wherein the curve forming portion is provided between the second substrate and the second reflective film.

7. The wavelength tunable interference filter according to claim 1,
wherein the second substrate includes a movable portion, in which the second reflective film is provided, and a holding portion, which is provided outside the movable portion in plan view and which holds the movable portion so as to be movable back and forth with respect to the first substrate, and
the curve forming portion is provided in the movable portion.

8. An optical filter device, comprising:
the wavelength tunable interference filter according to claim 1; and
a housing in which the wavelength tunable interference filter is housed.

9. An optical filter device, comprising:
the wavelength tunable interference filter according to claim 2; and
a housing in which the wavelength tunable interference filter is housed.

10. An optical filter device, comprising:
the wavelength tunable interference filter according to claim 3; and
a housing in which the wavelength tunable interference filter is housed.

11. An optical module, comprising:
the wavelength tunable interference filter according to claim 1.

12. An optical module, comprising:
the wavelength tunable interference filter according to claim 2.

13. An optical module, comprising:
the wavelength tunable interference filter according to claim 3.

14. An electronic apparatus, comprising:
the wavelength tunable interference filter according to claim 1; and
a control unit that controls the wavelength tunable interference filter.

15. An electronic apparatus, comprising:
the wavelength tunable interference filter according to claim 2; and
a control unit that controls the wavelength tunable interference filter.

16. A wavelength tunable interference filter, comprising:
a first substrate having a first reflective film and a first electrode;
a second substrate having a second reflective film facing the first reflective film and a second electrode facing the first electrode; and
a gap change portion that changes a size of a gap between the first and second reflective films using a potential difference between the first and second electrodes,
wherein the second substrate and the second reflective film are convex in an opposite direction to a direction, in which the first reflective film is disposed, when the potential difference is 0; and
a curve forming portion is provided on the second substrate and curves the second substrate to the opposite side to the side where the first substrate is disposed.

* * * * *